(12) United States Patent
Hagihara et al.

(10) Patent No.: US 8,354,494 B2
(45) Date of Patent: *Jan. 15, 2013

(54) POLYMERIZABLE LIQUID CRYSTAL COMPOSITION

(75) Inventors: Kazumi Hagihara, Chiba (JP); Ryushi Shundo, Chiba (JP)

(73) Assignees: JNC Petrochemical Corporation, Tokyo (JP); JNC Corporation, Tokyo (JP)

( * ) Notice: Subject to any disclaimer, the term of this patent is extended or adjusted under 35 U.S.C. 154(b) by 1396 days.

This patent is subject to a terminal disclaimer.

(21) Appl. No.: 12/003,368

(22) Filed: Dec. 21, 2007

(65) Prior Publication Data

US 2008/0152844 A1    Jun. 26, 2008

(30) Foreign Application Priority Data

Dec. 21, 2006   (JP) ................. 2006-343785

(51) Int. Cl.
*C08G 63/06* (2006.01)
*C08G 63/44* (2006.01)
(52) U.S. Cl. ............... 528/361; 428/411.1; 428/412; 528/176
(58) Field of Classification Search ........... 428/411.1, 428/412; 528/176, 361
See application file for complete search history.

(56) References Cited

U.S. PATENT DOCUMENTS

| | | | |
|---|---|---|---|
| 6,281,956 B1 | 8/2001 | Ohmuro et al. | |
| 6,685,998 B1 | 2/2004 | Nishikawa et al. | |
| 7,560,146 B2 * | 7/2009 | Hagihara et al. | 428/1.1 |
| 2005/0179005 A1 | 8/2005 | Kato et al. | |

FOREIGN PATENT DOCUMENTS

JP    10-152782    6/1998

OTHER PUBLICATIONS

Yuzo Hisatake et al., "A Novel Transflective TFT-LCD using Cholesteric Half Reflector", Asia Display/IDW '01, LCT8-2, 2001, pp. 129-132.

* cited by examiner

*Primary Examiner* — Terressa Boykin
(74) *Attorney, Agent, or Firm* — Wenderoth, Lind & Ponack, L.L.P.

(57) ABSTRACT

A cholesteric polymerizable liquid crystal composition excellent in UV curing property and alignment property is provided. The polymerizable liquid crystal composition contains at least one liquid crystal compound selected from compounds represented by Formula (1-1) and Formula (1-2), at least one liquid crystal compound selected from compounds represented by Formula (2), and 5 to 15% by weight of at least one optically active compound selected from compounds represented by Formula (4) and may contain at least one liquid crystal compound selected from compounds represented by Formula (3). The meanings of the symbols in the Formulae are described in the specification.

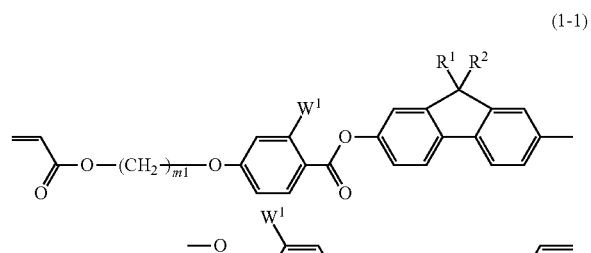

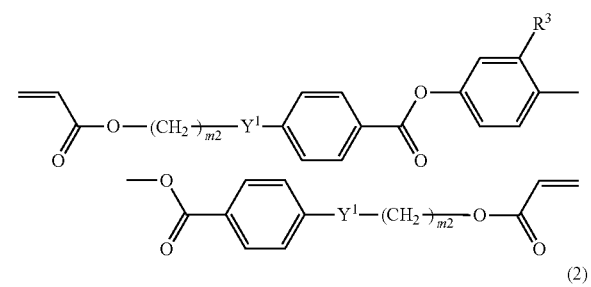

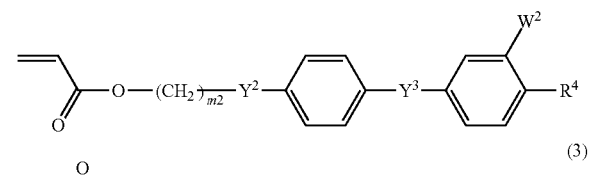

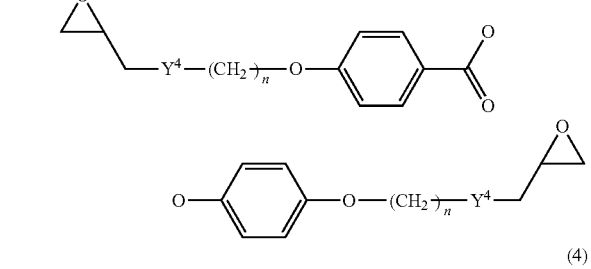

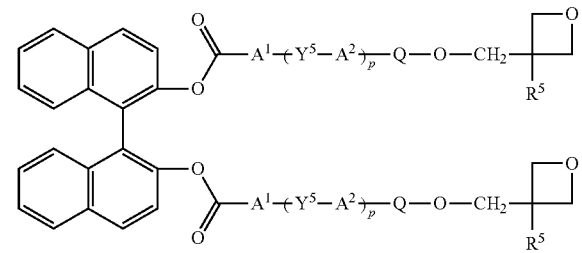

7 Claims, 1 Drawing Sheet

POLYMERIZABLE LIQUID CRYSTAL COMPOSITION

FIELD OF THE INVENTION

The present invention relates to a polymerizable cholesteric liquid crystal composition, a film having optical anisotropy obtained by polymerizing the composition, and use of the film.

BACKGROUND OF THE INVENTION

In recent years, a polymerizable liquid crystal composition has been used in a film having optical anisotropy. A polymerizable liquid crystal composition has optical anisotropy in a liquid crystal state, and alignment of a liquid crystal compound contained is fixed through polymerization. A helical structure is induced by adding an optically active compound to a polymerizable liquid crystal compound or composition, and it is applied to various optical devices depending on the pitch of the helical structure.

Examples of the application utilizing selective reflection of visible light include a design purpose, such as an ornamental material, and a color filter used in a liquid crystal display device. The application thereof also includes a anti-counterfeit technology utilizing such features in that reflected light and transmitted light have peculiar metallic gloss with change in color depending on viewing angle, and the optical characteristics cannot be duplicated with an ordinary duplicator. Furthermore, owing to application of the circularly polarized light separation function, such a luminance improving film is proposed that has a structure containing a quarter-wavelength plate and an optical anisotropy film exhibiting the circularly polarized light separation function, which are laminated on a polarizing plate. In these applications, the circularly polarized light separation function is demanded to be expressed over the whole visible light region (i.e., a region having a wavelength of from 350 to 750 nm), and accordingly, plural layers having different pitches are laminated, or the pitch is changed continuously in the thickness direction of the film (as described in Y. Hisatake, et al., Asia Display/IDW '01 LCT8-2).

Examples of the application as an optical compensation film of a liquid crystal display include optical compensation in an STN (super twisted nematic) liquid crystal display (as described in JP-A-2002-6138). A film having a fixed cholesteric alignment layer that transmits a visible light and reflects an ultraviolet ray having a wavelength range of 350 nm or less is referred to as a negative C-plate. A negative C-plate is used as an optical compensation plate suitable for improving viewing angle characteristics of a display device having such a mode as VA (vertically aligned), TN (twisted nematic), OCB (optically compensated birefringence) and HAN (hybrid aligned nematic). A negative C-plate can be used for viewing angle compensation of a VA mode as a combination with an optical compensation layer exhibiting positive birefringence, such as a positive A-plate (as described in JP-A-10-153802 and JP-A-10-152782).

In all the aforementioned purposes, development of such a photopolymerizable cholesteric liquid crystal composition that has the following characteristics is demanded. As characteristics of the photopolymerizable liquid crystal before curing, the composition has a cholesteric phase at room temperature, shows good alignment property, and has quick curing property upon irradiation of UV light, and as characteristics after curing, the composition has a suitable $\Delta n$, has transparency, and is excellent in heat resistance and humidity resistance.

In addition to the aforementioned optical characteristics, it is necessary to satisfy demands relating to polymerizability and physical and chemical characteristics of a polymer, upon optimizing the compound. The characteristics includes the polymerization rate of the compound, the polymerization degree, and the transparency, the mechanical strength, the coating property, the solubility, the crystallinity, the contractility, the water permeability, the water absorptivity, the gas permeability, the melting point, the glass transition point, the clearing point, the heat resistance and the chemical resistance of the polymer.

The inventors have proposed a cholesteric polymerizable liquid crystal composition having a cyclic ether, such as oxiranyl and oxetanyl, as a polymerizable group (as described in JP-A-2005-263778). The compound shows such favorable characteristics in that it can be cured with UV light in open air and shows good adhesion to a saponified triacetylcellulose film. However, the achiral polymerizable liquid crystal compound used as the major component of the composition (as described, for example, in JP-A-2005-60373 and Liquid Crystal, vol. 31, No. 12, pp. 1627-1637 (2004)) requires a long production process with high cost.

SUMMARY OF THE INVENTION

A first object of the invention is to provide such a cholesteric polymerizable liquid crystal composition that is excellent in UV curing property and alignment property. The polymerizable liquid crystal composition is often stored in the form of a solution formed by adding a solvent thereto. Accordingly, a second object of the invention is to provide such a polymerizable liquid crystal solution excellent in storage stability. A third object of the invention is to provide such a polymer film as a negative C-plate that is obtained by coating the composition on a plastic film or a glass plate, and then orienting and polymerizing the composition. Another object is to impart such heat resistance to the negative C-plate that is sufficient for using as an optical compensation film of a liquid crystal display device.

The inventors have prepared, for attaining the aforementioned and other objects, a composition obtained by mixing a compound (optically active compound) having a cyclic ether as a polymerizable group with a composition containing a polymerizable liquid crystal compound having an acryl group as the major component. It has been found that an optical polymerization initiator that has been appropriately selected is added to the composition, whereby UV light curing proceeds, and a film obtained through curing (i.e., a negative C-plate) has sufficient heat resistance and excellent adhesion property to a base material as equivalent to a cyclic ether composition, and thus the invention has been completed. The polymerizable liquid crystal composition of the invention is, in one aspect, the following item [1].

[1] A polymerizable liquid crystal composition that contains at least one liquid crystal compound selected from compounds represented by Formula (1-1) and Formula (1-2) as a component (A), contains at least one liquid crystal compound selected from compounds represented by Formula (2) as a component (B), may contain at least one liquid crystal compound selected from compounds represented by Formula (3) as a component (C), and contains at least one optically active compound selected from compounds represented by Formula (4) as a component (D), a ratio of the component (A) being from 45 to 85% by weight, a ratio of the component (B) being from 10 to 30% by weight, a ratio of the component (C) being from 0 to 10% by weight, and a ratio of the component (D) being from 5 to 15% by weight, based on a total weight of the composition:

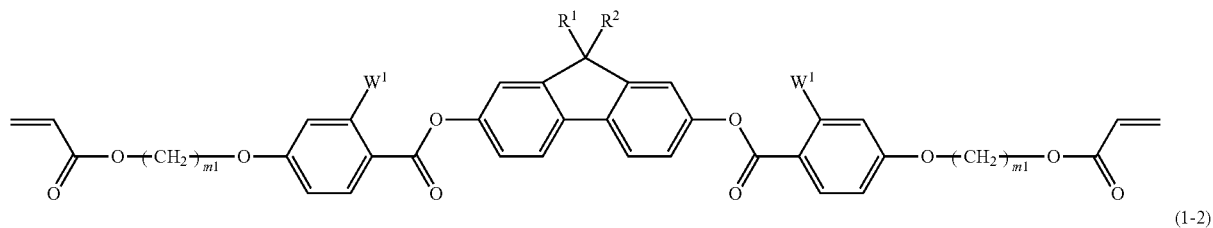

(1-1)

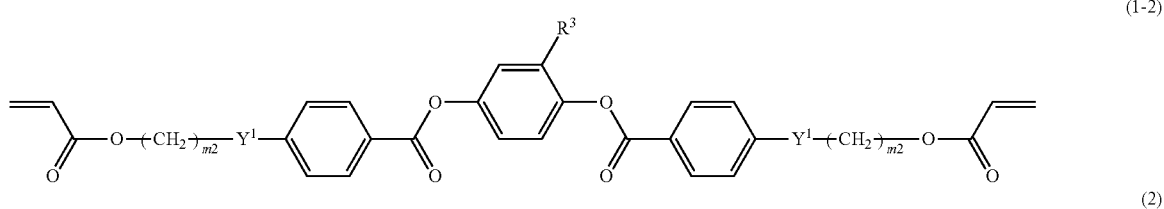

(1-2)

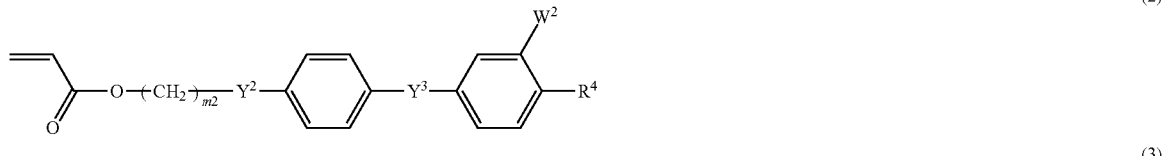

(2)

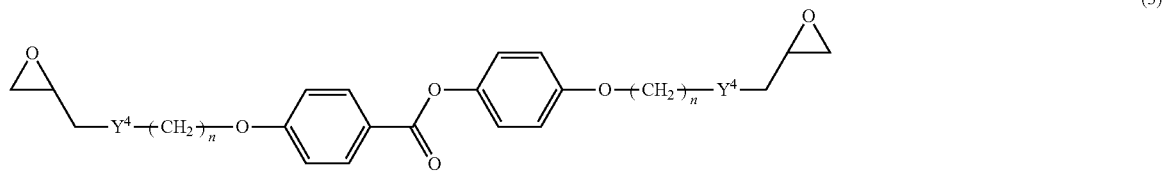

(3)

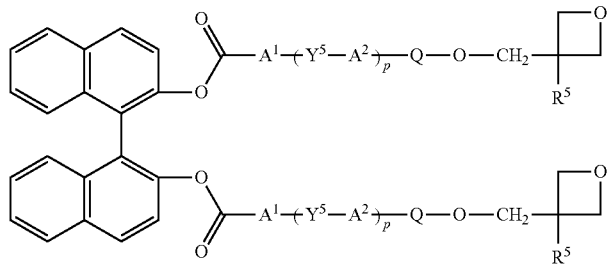

(4)

wherein in Formula (1-1), $R^1$ and $R^2$ each independently represents hydrogen, methyl, ethyl, fluorine or chlorine; $W^1$ independently represents hydrogen or fluorine; and m1 independently represents an integer of from 1 to 10, in Formula (1-2), $R^3$ represents hydrogen, methyl, fluorine, chlorine, acetyl, acetoxy or methoxy; $Y^1$ independently represents —O— or a group represented by Formula (5); and m2 independently represents an integer of from 1 to 10:

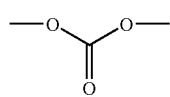

(5)

in Formula (2), $R^4$ represents cyano, fluorine, chlorine, —$OCF_3$, alkyl having from 1 to 10 carbon atoms or alkoxy having from 1 to 10 carbon atoms; $Y^2$ represents a single bond, —O— or a group represented by Formula (5); $Y^3$ represents a single bond, —COO—, —OCO— or —C≡C—; $W^2$ represents hydrogen or fluorine; and m2 represents an integer of from 1 to 10, in Formula (3), $Y^4$ independently represents a single bond or —O—; and n independently represents an integer of from 0 to 10, and in Formula (4), $R^5$ independently represents methyl or ethyl; $A^1$ independently represents 1,4-phenylene or 4,4'-biphenylene; $A^2$ independently represents 1,4-phenylene or 4,4'-biphenylene; $Y^5$ independently represents —COO— or —OCO—; Q independently represents a single bond or oxyalkylene having from 1 to 10 carbon atoms; and p independently represents 0 to 1.

DETAILED DESCRIPTION OF THE INVENTION

Figure 1:
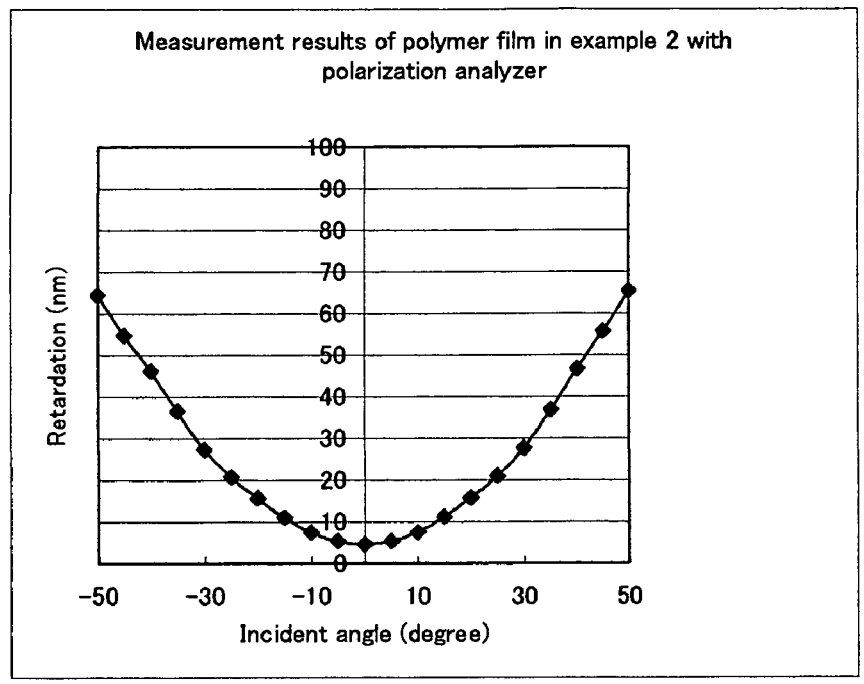
FIG. 1 is a graph showing measurement results of retardation of a polymer film obtained in Example 2 with a polarization analyzer.

The terms used herein are defined as follows. A liquid crystal compound is a generic term for a compound having a liquid crystal phase, such as a nematic phase and a smectic phase, and a compound having no liquid crystal phase but being useful as a component of a liquid crystal composition. A liquid crystal display device is a generic term for a liquid crystal display panel and a liquid crystal display module. A compound represented by Formula (1-1) is sometimes abbreviated as a compound (1-1). The abbreviation rule is also applied to other compounds, such as a compound represented by Formula (2). In Examples, the weight percentage and weights are data based on values expressed by a mass unit "g" (gram) displayed on an electronic balance. The percents by weight and the weight ratios are based on the values.

The invention includes the aforementioned item [1] and also the following items [2] to [7].

[2] The polymerizable liquid crystal composition according to the item [1], wherein
the ratio of the component (A) is from 50 to 75% by weight, the ratio of the component (B) is from 15 to 30% by weight, the ratio of the component (C) is from 3 to 7% by weight, and the ratio of the component (D) is from 7 to 13% by weight,
in Formula (1-1), $R^1$ and $R^2$ each independently represents hydrogen or methyl; $W^1$ represents hydrogen or fluorine; and m1 represents an integer of from 2 to 8,
in Formula (1-2), $R^3$ represents hydrogen or methyl; $Y^1$ represents —O— or a group represented by Formula (5); and m2 represents an integer of from 2 to 8:
in Formula (2), $R^4$ represents cyano, —$OCF_3$, alkyl having from 2 to 8 carbon atoms or alkoxy having from 2 to 8 carbon atoms; $Y^2$ represents —O— or a group represented by Formula (5); $Y^3$ represents a single bond or —COO—; $W^2$ represents hydrogen; and m2 represents an integer of from 2 to 8,
in Formula (3), $Y^4$ independently represents a single bond or —O—; and n independently represents an integer of from 0 to 4, and
in Formula (4), $R^5$ represents ethyl; $A^1$ represents 1,4-phenylene or 4,4'-biphenylene; $A^2$ represents 1,4-phenylene or 4,4'-biphenylene; $Y^5$ represents —OCO—; Q represents a single bond or oxyalkylene having from 2 to 8 carbon atoms; and p represents 0 to 1.

[3] The polymerizable liquid crystal composition according to the item [1], wherein
the ratio of the component (A) is from 57 to 78% by weight, the ratio of the component (B) is from 15 to 30% by weight, the ratio of the component (C) is 0% by weight, and the ratio of the component (D) is from 7 to 13% by weight,
in Formula (1-1), $R^1$ and $R^2$ each independently represents hydrogen or methyl; $W^1$ represents hydrogen or fluorine; and m1 represents an integer of from 2 to 8,
in Formula (1-2), $R^3$ represents hydrogen or methyl; $Y^1$ represents —O— or a group represented by Formula (5); and m2 represents an integer of from 2 to 8:
in Formula (2), $R^4$ represents cyano, —$OCF_3$, alkyl having from 2 to 8 carbon atoms or alkoxy having from 2 to 8 carbon atoms; $Y^2$ represents —O— or a group represented by Formula (5); $Y^3$ represents a single bond or —COO—; $W^2$ represents hydrogen; and m2 represents an integer of from 2 to 8, and
in Formula (4), $R^5$ represents ethyl; $A^1$ represents 1,4-phenylene or 4,4'-biphenylene; $A^2$ represents 1,4-phenylene or 4,4'-biphenylene; $Y^5$ represents —OCO—; Q represents a single bond or oxyalkylene having from 2 to 8 carbon atoms; and p represents 0 to 1.

[4] A polymer obtained by polymerizing the polymerizable liquid crystal composition according to any one of the items [1] to [3].

[5] A polymer film having optical anisotropy obtained by coating the polymerizable liquid crystal composition according to any one of the items [1] to [3] on a transparent plastic substrate or a glass substrate, orienting the composition, and polymerizing the composition.

[6] Use of the polymer film having optical anisotropy according to the item [5] as a negative C-plate.

[7] A viewing angle compensation film containing the negative C-plate according to the item [6], a positive A-plate and a polarizing plate laminated on each other.

The component (A) of the composition of the invention is a liquid crystal compound having two acryloyloxy groups and is at least one compound selected from compounds represented by Formula (1-1) and Formula (1-2).

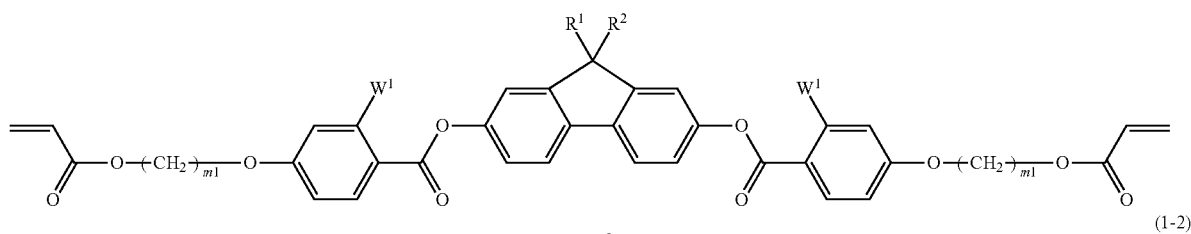

(1-1)

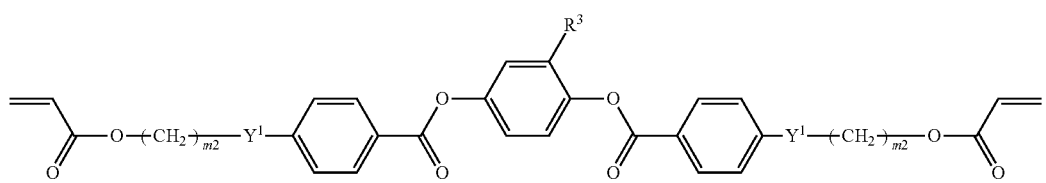

(1-2)

In Formula (1-1), $R^1$ and $R^2$ each independently represents hydrogen, methyl, ethyl, fluorine or chlorine, and preferably independently represents hydrogen or methyl; $W^1$ independently represents hydrogen or fluorine; and m1 independently represents an integer of from 1 to 10, and preferably represents an integer of from 2 to 8. Formula (1-1) contains two $W^1$, and they may be the same groups or different groups, and the same rule is applied to m1. Taking the production process into consideration, however, two $W^1$ preferably represent the same groups, and two m1 preferably represent the same numbers. A compound having two $W^1$ representing different groups and two m1 representing different numbers may be a mixture of plural compounds (1-1) through the production process of the compound, but the mixture may be used as the compound (1-1) as the component without any problem. Particularly preferred examples of the compound (1-1) include a compound represented by Formula (1-1) wherein at least one of $R^1$ and $R^2$ represents methyl; $W^1$ represents hydrogen or fluorine; and m1 represents an integer of from 2 to 8.

In Formula (1-2), $R^3$ represents hydrogen, methyl, fluorine, chlorine, acetyl, acetoxy or methoxy, and preferably hydrogen or methyl; $Y^1$ independently represents —O— or a group represented by Formula (5); and m2 independently represents an integer of from 1 to 10, and preferably from 2 to 8.

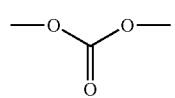
(5)

Formula (1-2) contains two $Y^1$, and they may be the same groups or different groups, and the same rule is applied to m2. Taking the production process into consideration, however, two $Y^1$ preferably represent the same groups, and two m2 preferably represent the same numbers. A compound having two $Y^1$ representing different groups and two m2 representing different numbers may be a mixture of plural compounds (1-2) through the production process of the compound, but the mixture may be used as the compound (1-2) as the component without any problem. Particularly preferred examples of the compound (1-2) include a compound represented by Formula (1-2) wherein $R^3$ represents hydrogen or methyl; $Y^1$ represents —O— or a group represented by Formula (5); and m2 represents an integer of from 2 to 8.

The compound (1-1) and the compound (1-2) exhibit a nematic liquid crystal phase in a wide temperature range around room temperature and are used as the major component for maintaining liquid crystallinity of the composition of the invention. In particular, the compounds have a high NI point and thus are necessary for increasing the NI point of the composition. The compounds are expected to attain improvement in curing rate owing to the acryloyloxy group contained therein as a polymerizable group. The ratio of the component (A) in the composition of the invention is from 45 to 85% by weight, and preferably from 50 to 75% by weight, based on the total weight of the composition. The ratio of the component (A) in the case where the component (C) is not used is preferably from 57 to 78% by weight, based on the total weight of the composition. The compound (1-1) and the compound (1-2) are totally referred to as a compound (1) in some cases.

Specific examples of the compound (1-1) include compounds (1-1-1) to (1-1-8), and specific examples of the compound (1-2) include compounds (1-2-1) to (1-2-11).

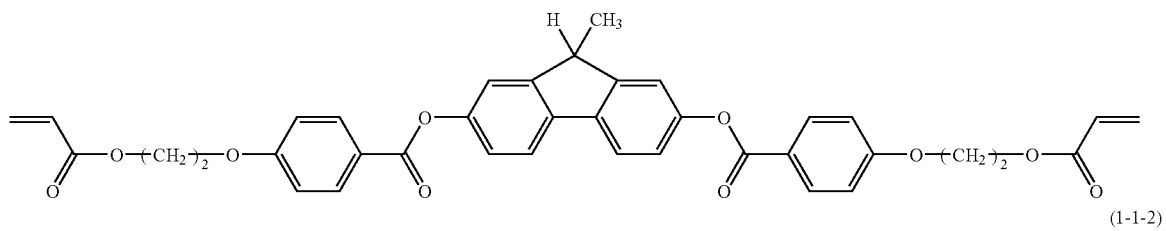
(1-1-1)

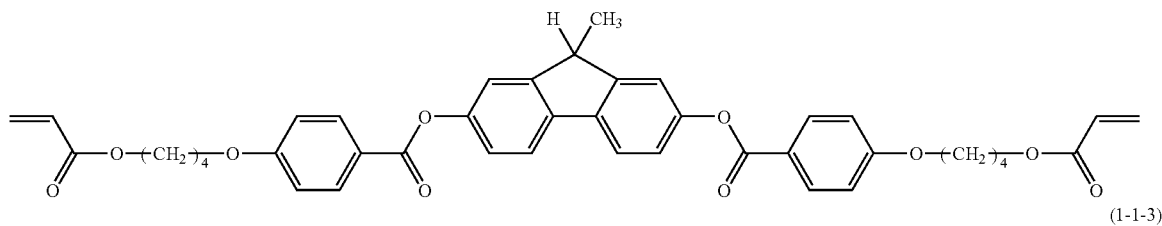
(1-1-2)

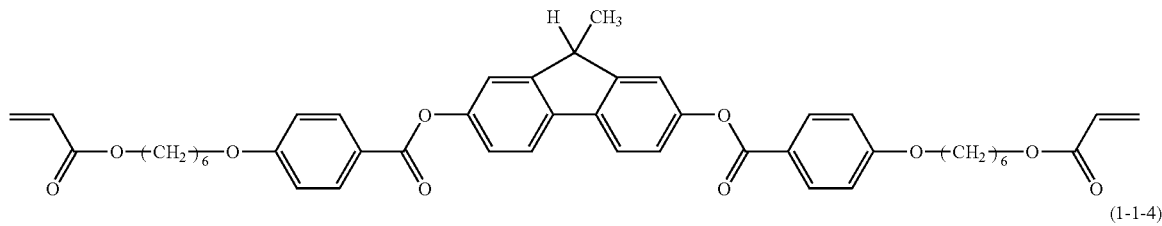
(1-1-3)

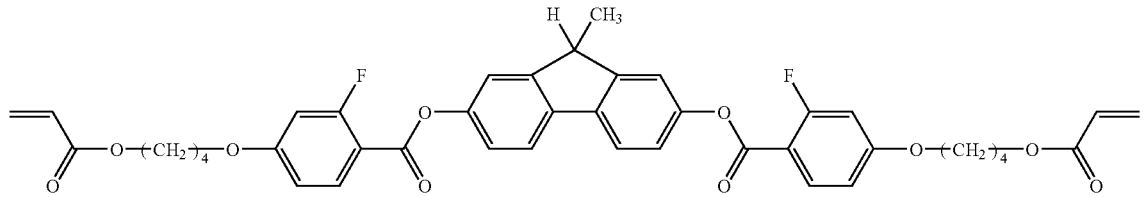
(1-1-4)

-continued
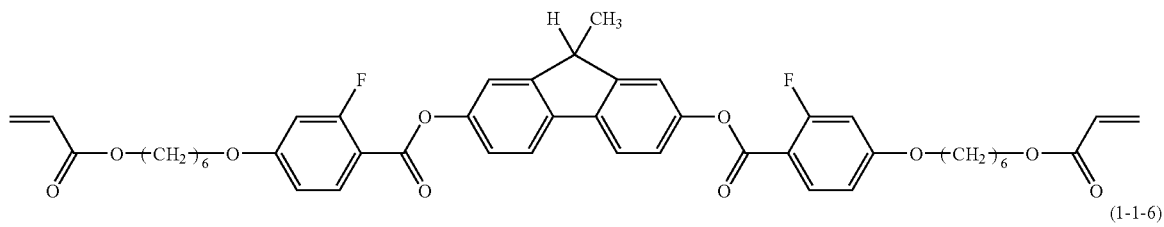
(1-1-5)
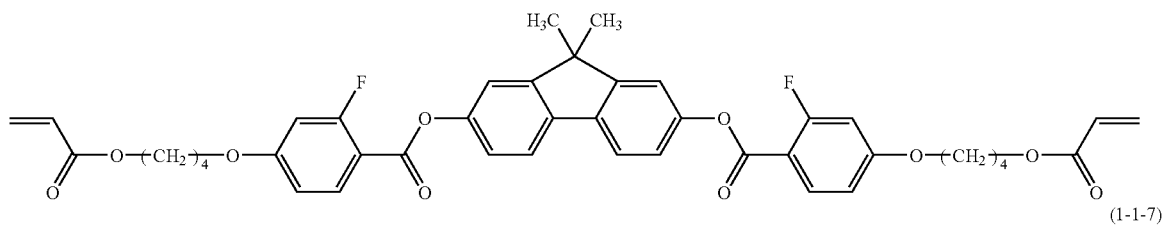
(1-1-6)
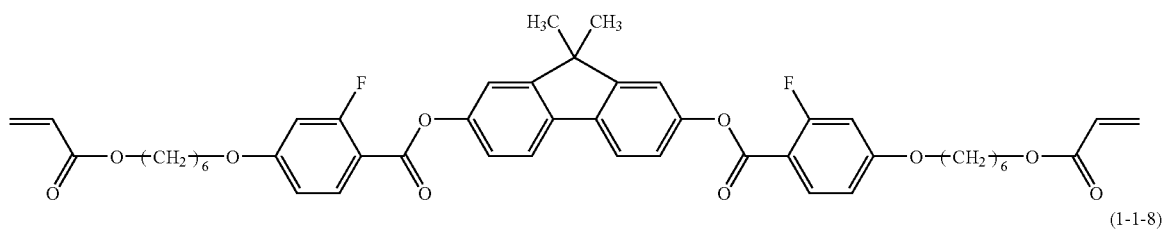
(1-1-7)
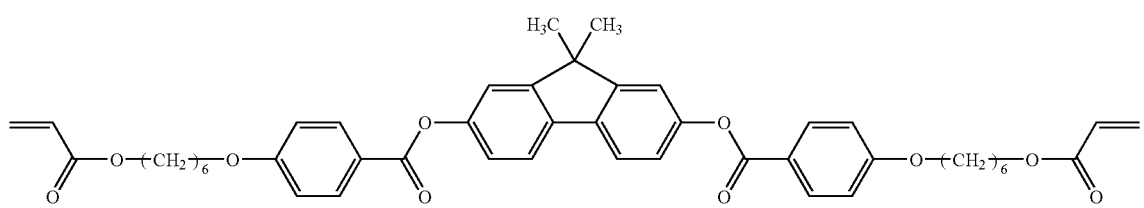
(1-1-8)
The compound (1-1) can be synthesized according to the method disclosed in JP-A-2003-238491.
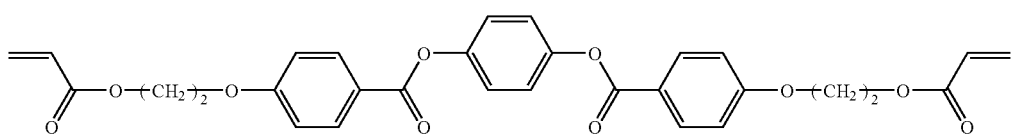
(1-2-1)
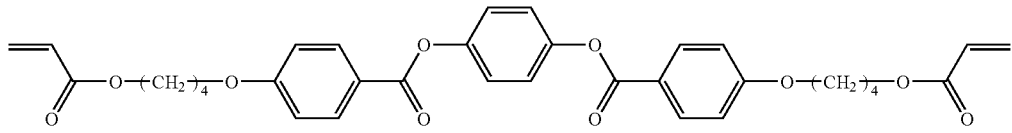
(1-2-2)
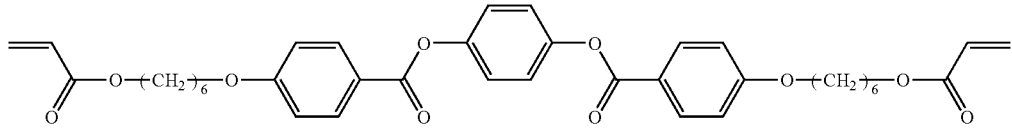
(1-2-3)
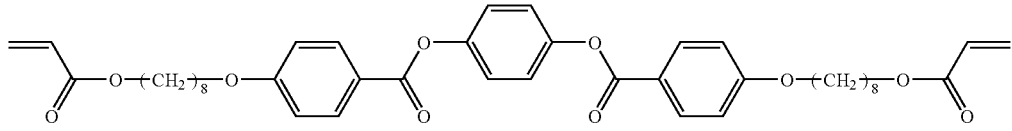
(1-2-4)

-continued

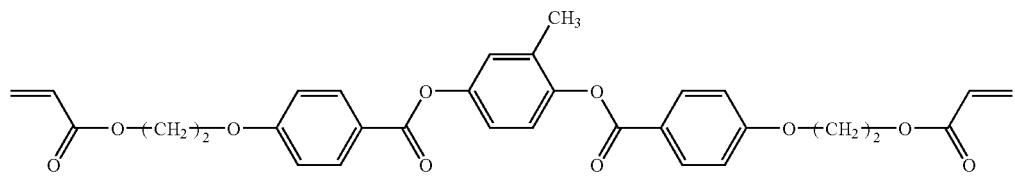
(1-2-5)

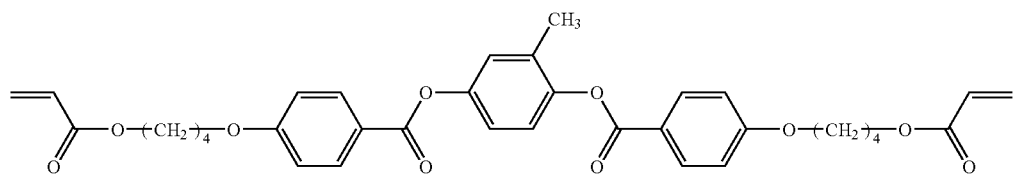
(1-2-6)

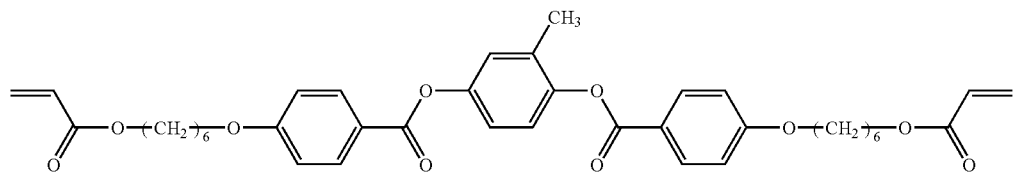
(1-2-7)

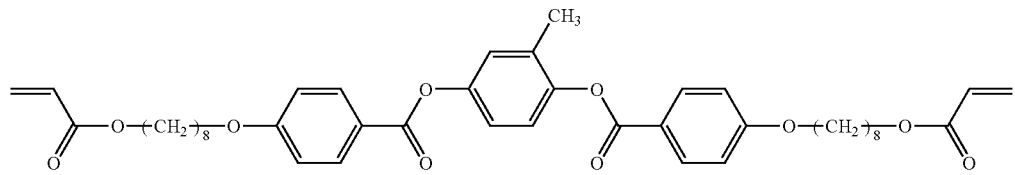
(1-2-8)

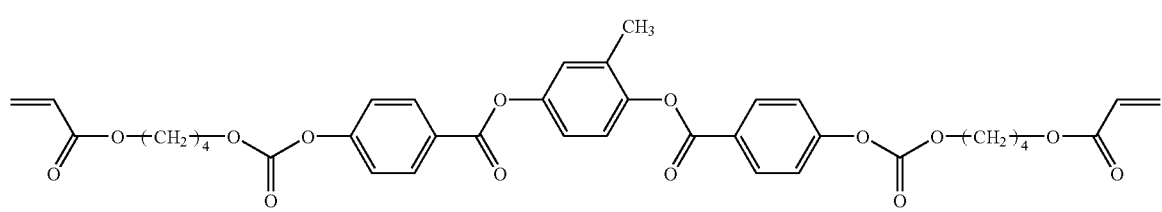
(1-2-9)

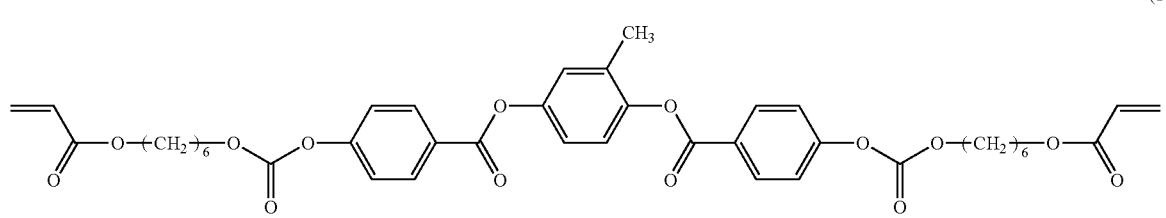
(1-2-10)

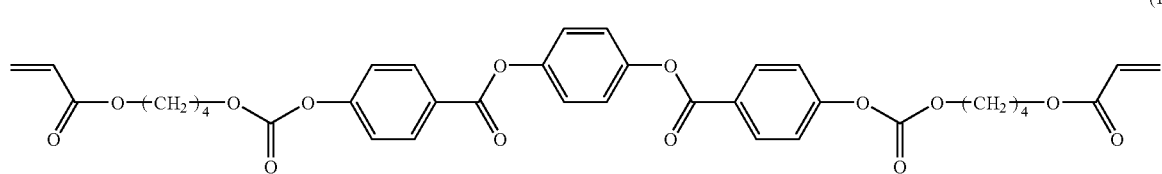
(1-2-11)

The compounds (1-2-1) to (1-2-8) can be synthesized according to the method disclosed in Makromol. Chem., vol. 190, pp. 2255-2268 (1989). The compounds (1-2-9) to (1-2-11) can be synthesized according to the method disclosed in WO97/00600.

The component (B) of the composition of the invention is a liquid crystal compound having an acryloyloxy group and is at least one compound selected from compounds represented by Formula (2).

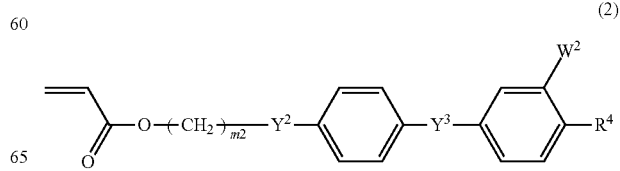
(2)

In Formula (2), $R^4$ represents cyano, fluorine, chlorine, —$OCF_3$, alkyl having from 1 to 10 carbon atoms or alkoxy having from 1 to 10 carbon atoms, and preferably cyano, —$OCF_3$, alkyl having from 2 to 8 carbon atoms or alkoxy having from 2 to 8 carbon atoms; $Y^2$ represents a single bond, —O— or a group represented by Formula (5), and preferably —O— or a group represented by Formula (5); $Y^3$ represents a single bond, —COO—, —OCO— or —C≡C—, and preferably a single bond or —COO—; $W^2$ represents hydrogen or fluorine, and preferably hydrogen; and m2 represents an integer of from 1 to 10, and preferably an integer of from 2 to 8. Particularly preferred examples of the compound (2) include a compound represented by Formula (2) wherein $R^4$ represents cyano, —$OCF_3$, alkyl having from 2 to 8 carbon atoms or alkoxy having from 2 to 8 carbon atoms; $Y^2$ represents —O— or a group represented by Formula (5); $Y^3$ represents a single bond or —COO—; $W^2$ represents hydrogen; and m2 represents an integer of from 2 to 8.

The compound (2) generally has a low melting point and is used as a component for decreasing the melting point of the composition of the invention. The use of the compound (2) also decreases the viscosity of the composition. The compound (2) is expected to attain improvement in curing rate owing to the acryloyloxy group contained therein as a polymerizable group. The ratio of the component (B) in the composition of the invention is from 10 to 30% by weight, and preferably from 15 to 30% by weight, based on the total weight of the composition.

Specific examples of the compound (2) include compounds (2-1) to (2-11).

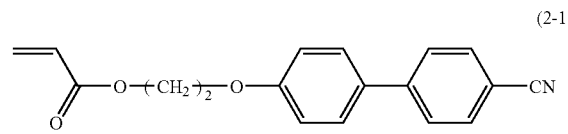
(2-1)

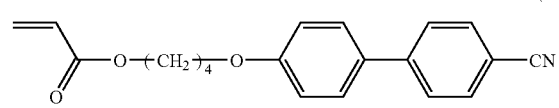
(2-2)

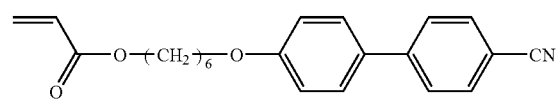
(2-3)

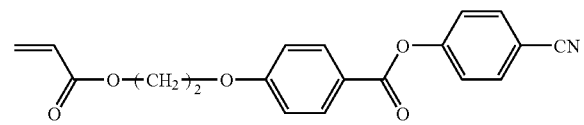
(2-4)

-continued

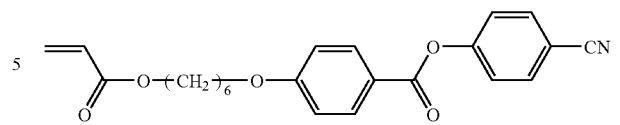
(2-5)

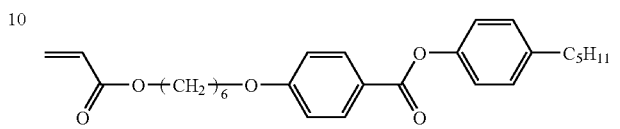
(2-6)

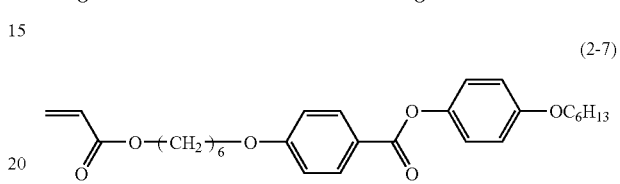
(2-7)

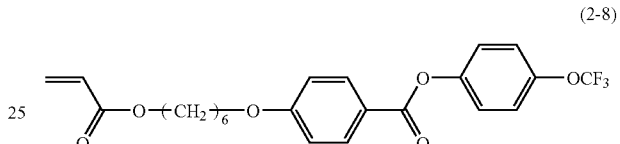
(2-8)

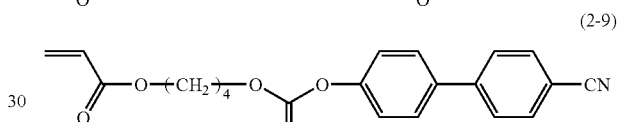
(2-9)

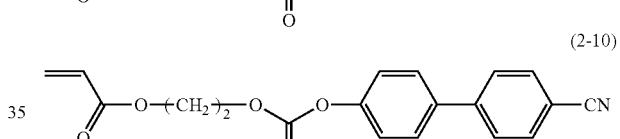
(2-10)

(2-11)

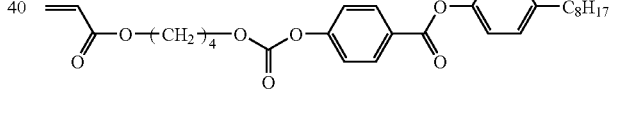

The synthesis methods of the compounds (2-2) and (2-3) are disclosed in Macromolecules, vol. 26, pp. 6132-6134 (1993). The compound (2-1) can be synthesized according to the similar method. The compounds (2-4) to (2-8) can be synthesized according to the method disclosed in Makromol. Chem., vol. 183, pp. 2311-2321 (1982). The compounds (2-9) and (2-10) can be synthesized according to the method disclosed in JP-A-5-213829. The compound (2-11) can be synthesized according to the method disclosed in WO97/00600.

The component (C) of the composition of the invention is at least one compound selected from compounds represented by Formula (3).

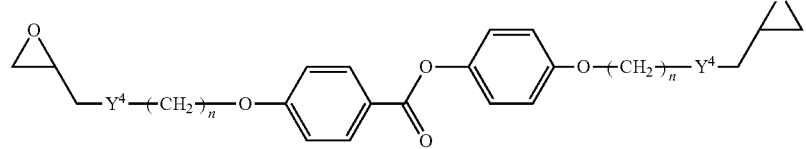
(3)

In Formula (3), $Y^4$ independently represents a single bond or —O—; and n independently represents an integer of from 0 to 10, and preferably independently represents an integer of from 0 to 4. In Formula (3), the group —$Y_4$—$(CH_2)_n$— is not —O—, and the group —$(CH_2)_n Y_4$— is not —O—. In other words, in the case where Y4 represents —O—, n represents an integer of from 1 to 10, and preferably an integer of from 1 to 4.

The compound (3) is a liquid crystal compound. The compound has nematic liquid crystallinity. The compound has an oxiranyl group as a polymerizable group and thus is expected to accelerate polymerization reaction in the coexistence of an optically active component having an oxetanyl group. The ratio of the component (C) in the composition of the invention is from 0 to 10% by weight based on the total weight of the composition. The component (C) is not an essential component. And when the component (C) is used, the preferable ratio of the component (C) in the composition of the invention is from 3 to 7% by weight based on the total weight of the composition. In the case where the component (C) is not added, polymerization may be decelerated, but a cured film having sufficient heat resistance can be obtained by adding a larger amount of an initiator or increasing radiation amount of ultraviolet light.

Specific examples of the compound (3) include compounds (3-1) to (3-6).

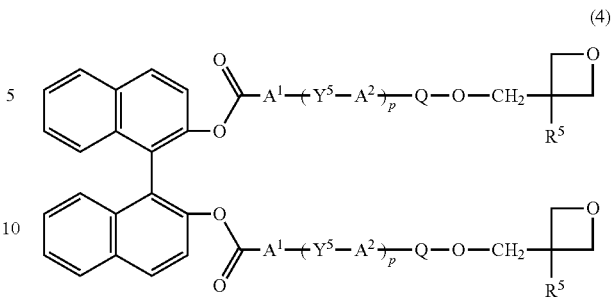

(4)

In Formula (4), $R^5$ independently represents methyl or ethyl, and preferably ethyl; $A^1$ independently represents 1,4-phenylene or 4,4'-biphenylene; $A^2$ independently represents 1,4-phenylene or 4,4'-biphenylene; $Y^5$ independently represents —COO— or —OCO—, and preferably —OCO—; Q independently represents a single bond or oxyalkylene having from 1 to 10 carbon atoms, and preferably a single bond or oxyalkylene having from 2 to 8 carbon atoms; and p independently represents 0 to 1. Formula (4) contains two occurrences for same symbols, and they may be the same as or different from each other. However, two occurrences of the symbol (for example, $A^1$) preferably represent the same groups (for example, 1,4-phenylene). In the case where the compound (4) containing different groups that are represented by the two same symbols is to be obtained, a mixture of plural compounds (4) may be obtained, but the mixture may be used as the compound (4) as the component without

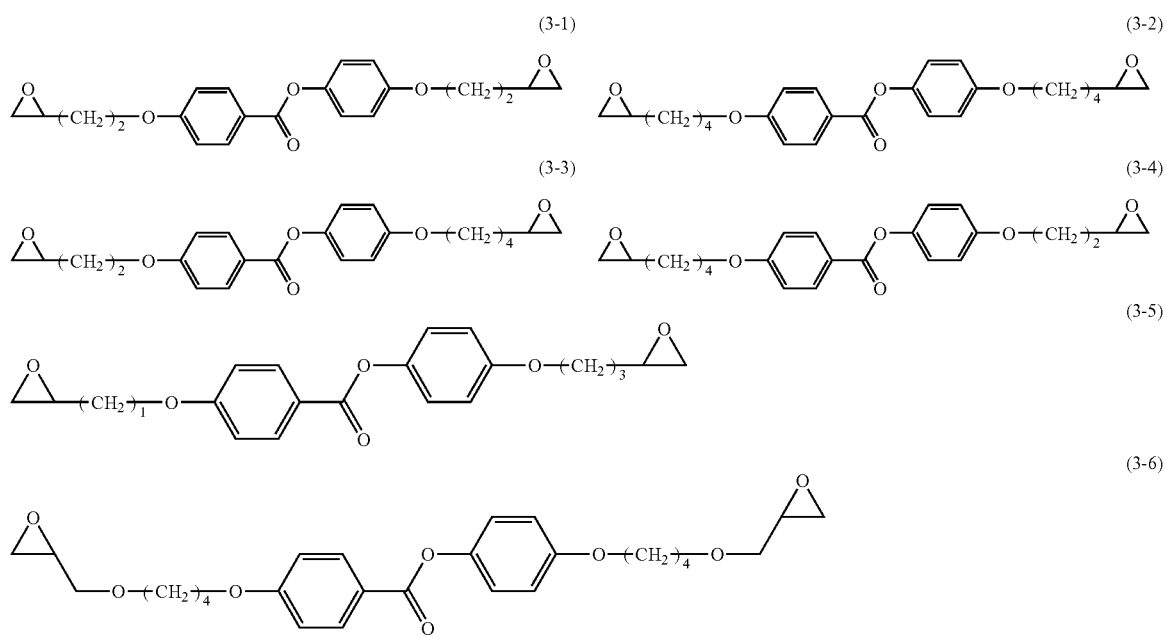

The synthesis methods of the compounds (3-1) to (3-6) are disclosed in Macromolecules, vol. 26, pp. 1244-1247 (1993), Macromol. Chem. Phys., vol. 202, pp. 180-187 (2001) and the like.

The component (D) of the composition of the invention is at least one optically active compound selected from compounds represented by Formula (4).

any problem. Preferred examples of the compound (4) include a compound represented by Formula (4) wherein $R^5$ represents ethyl; $A^1$ represents 1,4-phenylene or 4,4'-biphenylene; $A^2$ represents 1,4-phenylene or 4,4'-biphenylene; $Y^5$ represents —OCO—; Q represents a single bond or oxyalkylene having from 2 to 8 carbon atoms; and p represents 0 to 1.

Specific examples of the compound (4) include the following compounds.

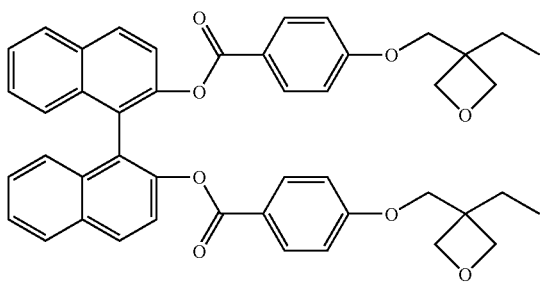
(4-1)
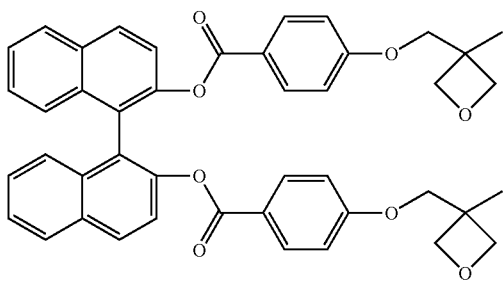
(4-2)
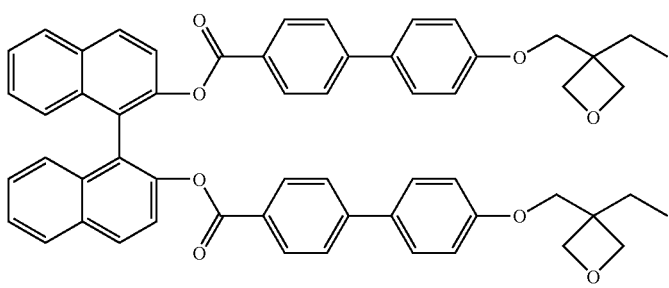
(4-3)
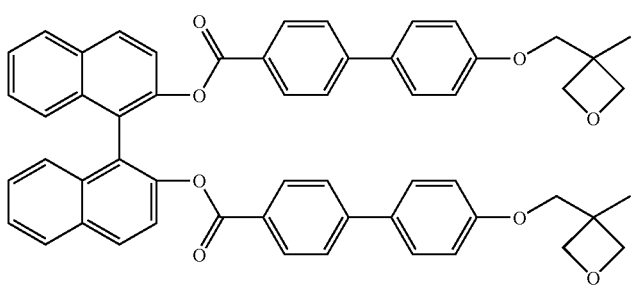
(4-4)
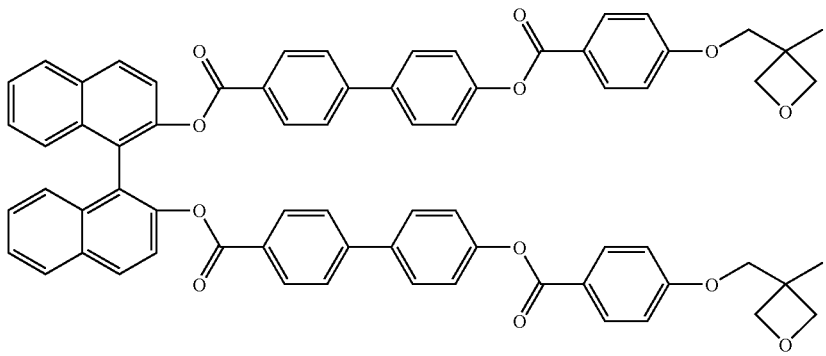
(4-5)

-continued
(4-6)
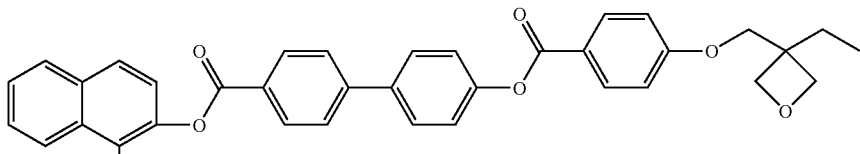
(4-7)
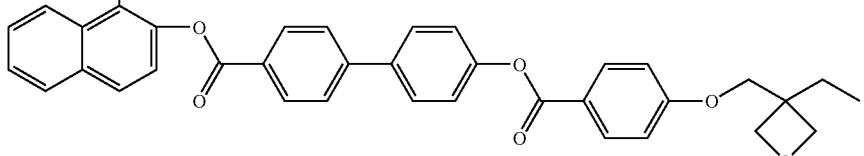
(4-8)
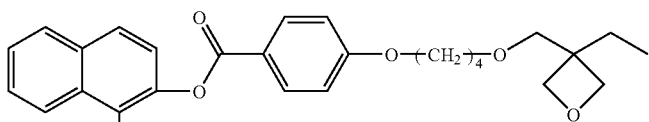
(4-9)
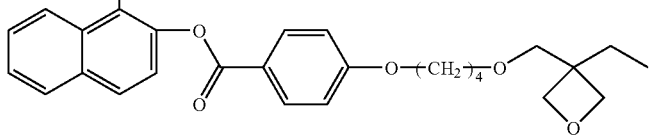
(4-10)
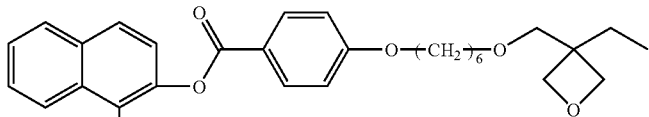

-continued

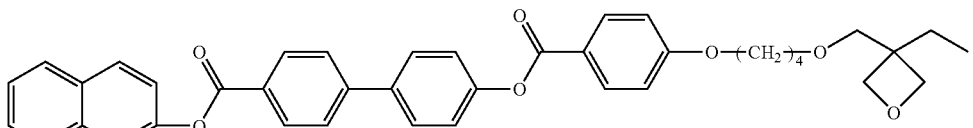
(4-11)

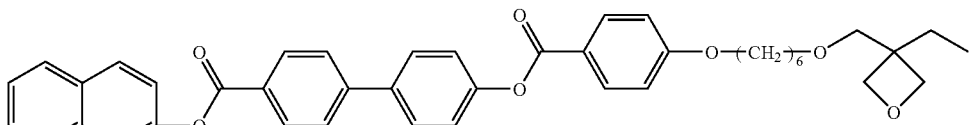
(4-12)

The compounds (4-1) to (4-8) can be obtained in such a manner that commercially available 3-methyl-3-hydroxymethyloxetane or 3-ethyl-3-hydroxymethyloxetane is tosylated with p-toluenesulfonic acid chloride and pyridine, and the product is etherified with a hydroxycarboxylate ester and further hydrolyzed to obtain a carboxylic acid derivative, which is then finally subjected to esterification reaction with 1,1'-bi-2-naphthol for synthesis. The compounds (4-9) to (4-12) can be synthesized according to the method disclosed in JP-A-2005-263778.

The compound (4) is an optically active compound and exhibits large HTP. The compound does not exhibit liquid crystallinity, but provides a cholesteric liquid crystal composition having large helix inducing power by mixing the compound with the polymerizable liquid crystal composition. The compound (4) has an oxetanyl group and thus is expected to have an effect of increasing the polymerization degree upon polymerization. The ratio of the component (D) of the composition of the invention is from 5 to 15% by weight, and preferably from 7 to 13% by weight, based on the total weight of the composition.

A photopolymerization catalyst is added to the polymerizable liquid crystal composition of the invention. The photopolymerization catalyst is preferably a combination of a photopolymerization initiator and a photosensitizer. Preferred examples of the photopolymerization initiator include a mixture of a diaryliodonium salt (hereinafter, referred to as DAS) as a cationic photopolymerization catalyst and a radical photopolymerization initiator. Particularly preferred examples of the DAS include the following compounds (6-1-1) to (6-1-8). The most preferred example of the photopolymerization initiator is the compound (6-1-1). The DAS may be used solely or as a mixture of plural kinds of them.

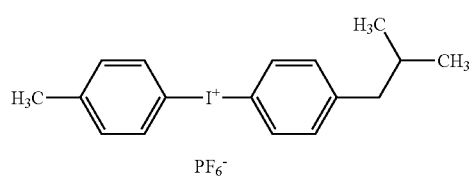
(6-1-1)

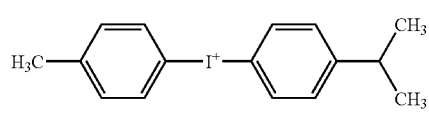
(6-1-2)

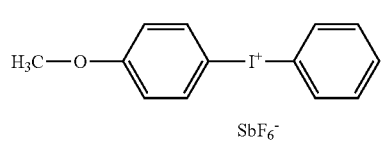
(6-1-3)

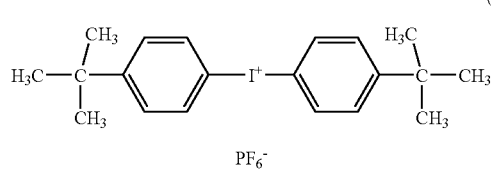
(6-1-4)

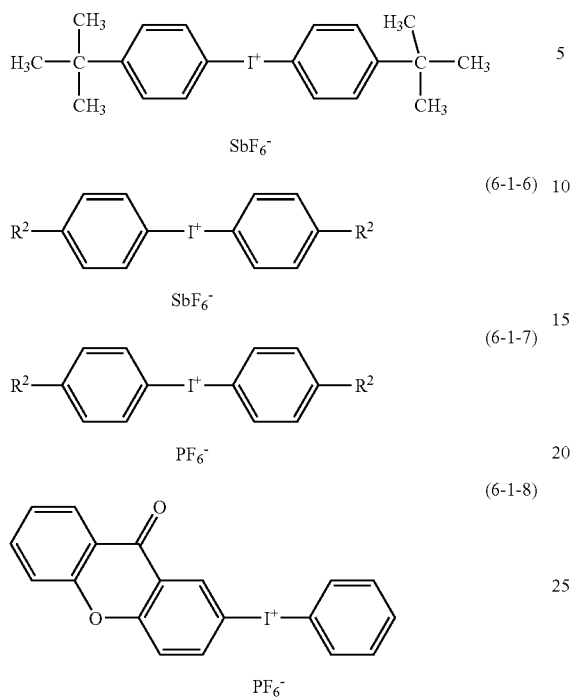

(6-1-5)

(6-1-6)

(6-1-7)

(6-1-8)

The compound (6-1-1) is commercially available as Irgacure 250 from Ciba Specialty Chemicals Co., Ltd. The compound (6-1-2) is commercially available as RHODOSIL Photoinitiator 2094 from Rhodia Silicones. The compound (6-1-3) is commercially available as MPI-103 from Midori Kagaku Co., Ltd. The compound (6-1-4) is commercially available as BBI-102 from Midori Kagaku Co., Ltd. The compound (6-1-5) is commercially available as BBI-103 from Midori Kagaku Co., Ltd. The compound (6-1-6) wherein $R^2$ represents $C_{12}H_{25}$ is commercially available as UV-9380C from GE Silicones, Inc. The compound (6-1-8) is commercially available from Wako Pure Chemical Industries, Ltd.

A radical photopolymerization initiator is used in combination for further accelerating curing of the polymerizable liquid crystal composition of the invention. Examples of the radical photopolymerization initiator include a benzylketal derivative, an α-hydroxyacetophenone derivative and an α-aminoacetophenone derivative, and preferred examples thereof include the following compounds (7-3-1) to (7-3-5). Particularly preferred examples of the radical polymerization initiator include the compounds (7-3-2) and (7-3-3). The radical polymerization initiator may be used solely or as a mixture of plural kinds of them.

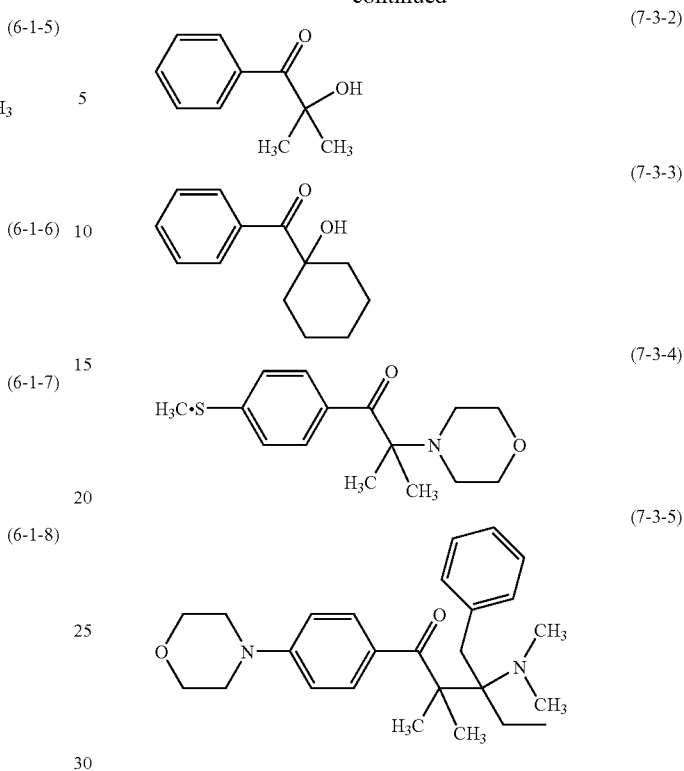

The compounds (7-3-1) to (7-3-5) are commercially available from Ciba Specialty Chemicals Co., Ltd. The trade names of the compounds are Irgacure 651 for the compound (7-3-1), Darocure 1173 for the compound (7-3-2), Irgacure 184 for the compound (7-3-3), Irgacure 907 for the compound (7-3-4), and Irgacure 369 for the compound (7-3-5).

By using the photopolymerization catalyst and the photosensitizer, the sensitivity to ultraviolet light is increased to suppress the addition amount of the photopolymerization catalyst from being increased. Examples of the photosensitizer include a thioxanthone derivative, an anthraquinone derivative and a naphthoquinone derivative, and preferred examples thereof include the following compounds (8-2-1) to (8-2-6). Particularly preferred examples of the photosensitizer include the compounds (8-2-4), (8-2-5) and (8-2-6). The photosensitizer may be used solely or as a mixture of plural kinds of them.

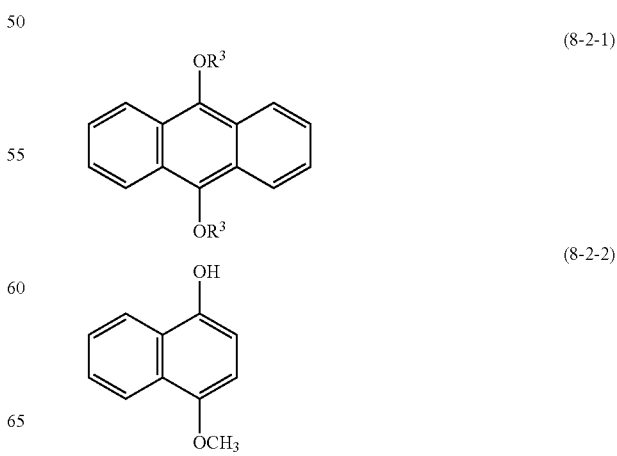

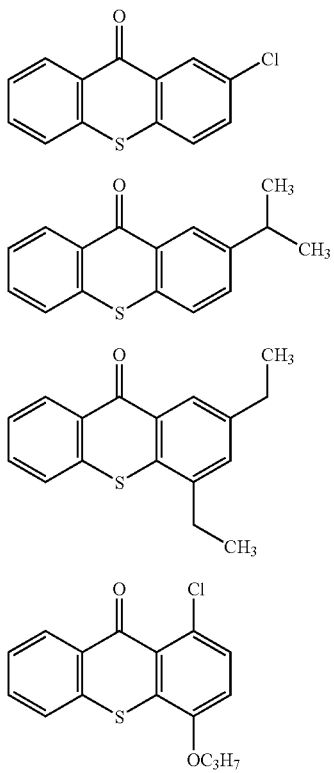

The compound (8-2-1) wherein $R^3$ represents linear butyl is commercially available as ANTHRACURE UVS-1331 from Kawasaki Kasei Chemicals, Ltd. The compound (8-2-2) is commercially available as ANTHRACURE ET-2111 from Kawasaki Kasei Chemicals, Ltd. The compound (8-2-3) is commercially available as Speedcure CTX from Lambson Group, Ltd. The compound (8-2-4) is commercially available as Quantacure ITX from Shell Chemicals Co. Ltd. The compound (8-2-5) is commercially available as KAYACURE DETX-S from Nippon Kayaku Co., Ltd. The compound (8-2-6) is commercially available as Speedcure CPTX from Lambson Group, Ltd.

The preferred mixing ratio of the photo-polymerization catalyst is from 20 to 30 parts by weight of the photosensitizer per 50 parts by weight of the DAS and 50 parts by weight of the radical photopolymerization initiator.

The polymerizable liquid crystal composition of the invention has, for example, the following advantages.

(1) The composition has a NI point (nematic-isotropic phase transition temperature) of 70° C. or more. Accordingly, the composition can maintain a liquid crystal state even in the case where the solvent drying step is carried out at a high temperature after coating the solution on a substrate. The composition can be aligned at a high temperature, whereby favorable alignment without alignment defects can be obtained.

(2) The composition has good adhesiveness to a substrate film (such as a saponified TAC film) to prevent peeling.

(3) The composition provides a film having sufficient heat resistance without tackiness with a small UV radiation amount.

(4) A film obtained by polymerizing the composition of the invention can be used as an optical compensation film, such as a negative C-plate.

The polymerizable liquid crystal composition of the invention may further contain additives depending on necessity for controlling the properties of the polymer. Examples of the additives include a non-liquid crystalline polyfunctional polymerizable compound, a surfactant, an antioxidant, an ultraviolet ray absorbent and a solvent. The atoms constituting the components of the composition may preferably contain isotopes thereof at a ratio larger than the natural abundance since the components have the similar characteristics.

The non-liquid crystalline polyfunctional polymerizable compound is used for controlling the film forming property, the mechanical strength and the like of the polymer. Examples of the polymerizable compound include a polyfunctional acrylate compound. Examples thereof include 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, dimethyloltricyclodecane diacrylate, trimethylolpropane triacrylate, trimethylol ethylene oxide adduct triacrylate, pentaerythritol triacrylate, trisacryloxyethyl phosphate, bisphenol A ethylene oxide adduct diacrylate, bisphenol A glycidyl acrylate (Viscoat 700, a trade name, produced by Osaka Organic Chemical Industry Ltd.), and polyethylene glycol diacrylate. These compounds are suitable for improving the film forming property of the polymer. In addition to these compounds, a polyfunctional vinyl ether compound, an oxetane compound and the like can be used as the non-liquid crystalline polymerizable compound.

Examples of the surfactant include a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, an amine lauryl sulfate compound, an alkyl-substituted aromatic sulfonate salt, an alkyl phosphate salt, a perfluoroalkyl sulfonate salt, a perfluoroalkyl carboxylate salt, a perfluoroalkyl ethylene oxide adduct and a perfluoroalkyltrimethylammonium salt. The surfactant has such effect as facilitating a coating operation of the composition on a supporting substrate and the like. The preferred ratio of the surfactant varies depending on the kind of the surfactant, the Formulation of the composition and the like, and is from 100 ppm to 5% by weight, and more preferably from 0.1 to 1% by weight, based on the total weight of the composition.

Examples of the antioxidant include hydroquinone, 2,6-di-t-butyl-p-cresol, 2,6-di-t-butylphenol, triphenyl phosphite and trialkyl phosphite. Preferred examples of commercially available products of the antioxidant include Irganox 245 and Irganox 1035, produced by Ciba Specialty Chemicals Co., Ltd.

Examples of the ultraviolet ray absorbent include TINUVIN PS, TINUVIN 292, TINUVIN 109, TINUVIN 328, TINUVIN 384-2, TINUVIN 123, TINUVIN 400 and TINUVIN N400L, produced by Ciba Specialty Chemicals Co., Ltd.

Examples of the solvent include benzene, toluene, xylene, mesitylene, butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, ethyl lactate, methyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve, ethanol, methanol, isopropanol and 3-methoxybutyl acetate. The solvent may be used solely or as a mixture of plural kinds of them. Upon using the solvent, the ratio of the composition of the invention preferably provides, for example, a solution of from 5 to 95% by weight, and more preferably from 10 to 50% by weight. The ratio may be set depending on the viscosity of the composition, and therefore, the invention is not restricted by the ranges referred herein.

The polymerization condition of the composition of the invention will be described. A polymer is obtained by polymerizing the composition of the invention. The reaction for polymerization is preferably photo polymerization. Preferred examples of light used for photopolymerization include an ultraviolet ray, a visible ray and an infrared ray. An electromagnetic wave, such as an electron beam and an X-ray, may also be used. The wavelength of the light may be selected depending on the absorption wavelength of the photopolymerization initiator used. In general, an ultraviolet ray and a visible ray are preferred. The wavelength range is preferably from 150 to 500 nm, more preferably from 250 to 450 nm, and most preferably from 300 to 400 nm. Examples of the light source include a low pressure mercury lamp (such as a bactericidal lamp, a fluorescent chemical lamp and a black light), a high pressure discharge lamp (such as a high pressure mercury lamp and a metal halide lamp), and a short arc discharge lamp (such as a super high pressure mercury lamp, a xenon lamp and a mercury xenon lamp). The light source is most preferably a super high pressure mercury lamp. The light emitted from the light source may be radiated as it is on the composition. Light having a specific wavelength (or a specific wavelength range) selected with a filter may be radiated on the composition. The radiation energy density is preferably from 2 to 5,000 mJ/cm$^2$, more preferably from 10 to 3,000 mJ/cm$^2$, and particularly preferably from 100 to 2,000 mJ/cm$^2$. The illuminance is preferably from 0.1 to 5,000 mW/cm$^2$, and more preferably from 1 to 2,000 mW/cm$^2$. The temperature when light is radiated is set in such a manner that the composition has a liquid crystal phase. The radiation temperature is preferably 100° C. or less. In the case where the radiation temperature exceeds 100° C., polymerization may occur due to heat to provide such a possibility that favorable alignment cannot be obtained.

Examples of the shape of the polymer include a film and a plate. The polymer may be molded. In order to obtain the polymer in a film form, a supporting substrate is generally used. The composition is coated on a supporting substrate, and a coated film (paint film) having a liquid crystal phase is polymerized to obtain the film. The preferred thickness of the polymer varies depending on the optical anisotropy value and the purpose of the polymer, and therefore, the thickness cannot be determined unconditionally. In general, the thickness is preferably in a range of from 0.05 to 50 μm, more preferably from 0.1 to 20 μm, and particularly preferably from 0.5 to 10 μm. The haze value of the polymer is generally 1.5% or less. The transmittance of the polymer is generally 80% or more in a visible region. The polymer is suitable as a thin film having optical anisotropy used in a liquid crystal display device.

Examples of the supporting substrate include films of triacetyl cellulose (TAC), polyvinyl alcohol, polyimide, polyester, polyarylate, polyetherimide, polyethylene terephthalate and polyethylene naphthalate. Examples of trade names of a commercially available products thereof include "Arton" produced by JSR Corp., "Zeonex" and "Zeonor" produced by Zeon Corp., "APEL" produced by Mitsui Chemicals, Inc., and "TOPAS" produced by Ticona, Inc. The supporting substrate may be a uniaxially stretched film or a biaxially stretched film. Preferred examples of the supporting substrate include a TAC film. A TAC film may be used as it is without pretreatment or may be used after subjecting to a saponification treatment. "Zeonex", "APEL" and "TOPAS" may be subjected to a surface treatment, such as a corona discharge treatment and an UV-ozone treatment. Examples of the supporting substrate also include a metallic supporting substrate, such as aluminum, iron and copper, and a glass supporting substrate, such as alkaline glass, borosilicate glass and flint glass.

The coated film on the supporting substrate can be prepared by coating the composition as it is. The coated film may also be prepared by coating a solution obtained by dissolving the composition in a suitable solvent, and then removing the solvent. Examples of the coating method include a spin coating method, a roll coating method, a curtain coating method, a flow coating method, a printing method, a microgravure coating method, a gravure coating method, a wire bar coating method, a dip coating method, a spray coating method and a meniscus coating method.

The factors determining the alignment of the liquid crystal molecules in the polymerizable liquid crystal composition are (1) the kinds of the compounds contained in the composition, (2) the kind of the supporting substrate, (3) the method of alignment, and the like. Accordingly, the alignment also depends on the mixing ratio of the compound (1) and the compound (2) and the material of the supporting substrate. The alignment further depends on the treating method, such as rubbing in one direction with a rayon cloth, obliquely vapor-depositing silicon oxide, and etching in a slit form. In the rubbing treatment, the supporting substrate may be directly rubbed, or alternatively, after coating a thin film of polyimide, polyvinyl alcohol or the like on the supporting substrate, the thin film may be rubbed. Such a special thin film has been known that provides favorable alignment without rubbing treatment. A liquid crystal polymer may be coated on the supporting substrate.

The film as the polymer of the invention will be described. The polymer is obtained by polymerizing the composition of the invention. The polymer film satisfies plural characteristics among such characteristics as colorless and transparent, a small photoelasticity, hard to release from the supporting substrate, tack-free, large heat resistance and large weather resistance. The polymer is also excellent in such characteristics as impact resistance, workability, electric characteristics and solvent resistance. Important characteristics upon preparing the polymer film are hard to release from the supporting substrate, having sufficient hardness, having large heat resistance, and the like.

The thickness (d) of the polymer is controlled as follows. In the method of diluting the composition with a solvent, and then coating the solution on the supporting substrate, a coated film having a target thickness can be obtained by properly selecting such conditions as the concentration of the composition, the method of coating and the condition for coating. A method using a liquid crystal cell is also preferably used. A liquid crystal cell is preferably used since it has an alignment film, such as polyimide. Upon charging the composition into the liquid crystal cell, the thickness of the coated film can be controlled by the gap of the liquid crystal cell.

The use of the polymer is as follows. The polymer can be used as a film having optical anisotropy. Examples of the use of the polymer include an optical film, such as a selective reflection film and a viewing angle compensation film. The polymer may be used as a color filter, a reflection polarizing plate, a phase retarder, an illuminance improving film and a negative C-plate. The polymer may also be used as a cosmetic, an ornamental material, a non-linear optical material and an information memory material.

EXAMPLES

The invention will be described in more detail with reference to the following examples. The examples are mentioned only for exemplification, and therefore, the invention is not construed as being limited to the examples. The measurement methods for the physical characteristics are described.

<Cellophane Adhesive Tape Peeling Test>

The measurement was carried out according to JIS K5400, 8.5 Adhesiveness (8.5.2 crosscut adhesive tape method). The evaluation was made with the number of squares that were not peeled among 100 squares.

<Pencil Hardness>

The measurement was carried out according to JIS K5400, 8.4 Pencil Scratch Test. The results were expressed by hardness of the pencil tip.

<Heat Resistance Test>

The test was carried out under the condition of 80° C. for 12 hours, and the evaluation was made with fluctuation in retardation. Polyamic acid (PIA5310, produced by Chisso Corp.) was coated on a glass substrate, which was then heated to 210° C. for 30 minutes to prepare a supporting substrate. The surface of the polyimide thus formed was rubbed with a rayon cloth. The cholesteric polymerizable liquid crystal composition as a specimen was diluted with toluene to prepare a solution having a concentration of 30% by weight. The solution was coated on the supporting substrate with a spin coater, and the coated film was heated to 70° C. for 3 minutes and then irradiated with an ultraviolet ray (30 mW/cm$^2$, 365 nm) at room temperature for 60 seconds by using a super high pressure mercury lamp (250 W). The resulting polymer film was measured for retardation at 25° C. The polymer was heated to 80° C. for 12 hours and then again measured for retardation at 25° C. The heat resistance was evaluated by comparing the two measured values. The retardation was measured by using a polarization analyzer.

<Optical Anisotropy ($\Delta n$)>

The retardation (25° C.) of the polymer film was measured according to the aforementioned method of the heat resistance test. The thickness (d) of the polymer film was measured with a surface roughness meter. The optical anisotropy was calculated from the relationship, retardation=$\Delta n \times d$.

<Alignment of Liquid Crystal Molecules>

The polymer film (liquid crystal aligned film) was prepared on a TAC film having been subjected to a saponification treatment. The alignment of the polymer was determined through analysis with a polarization analyzer based on the dependency of transmission light intensity on angle.

<Measurement with Polarization Analyzer>

A polarization analyzer, OPTIPRO, produced by Thing-Tech Corp. was used. The polymer film was irradiated with light having a wavelength of 550 nm. The retardation ($\Delta n \times d$) was measured while the incident angle of the light was decreased from 90° with respect to the film surface.

<Confirmation of Tackiness>

The film having been cured with UV was touched with the fingers to confirm the presence of tackiness.

Confirmation of Storage Stability

The accelerated test was carried out by placing the solution in an oven at 50° C., and the extent of increase in viscosity was confirmed.

Example 1

<Preparation of Composition (PLC-1)>

A cholesteric polymerizable liquid crystal composition (MIX1) containing the compound (1-1-3), the compound (2-3), the compound (3-1) and the compound (4-12) was prepared. The composition had a NI point of 105° C.

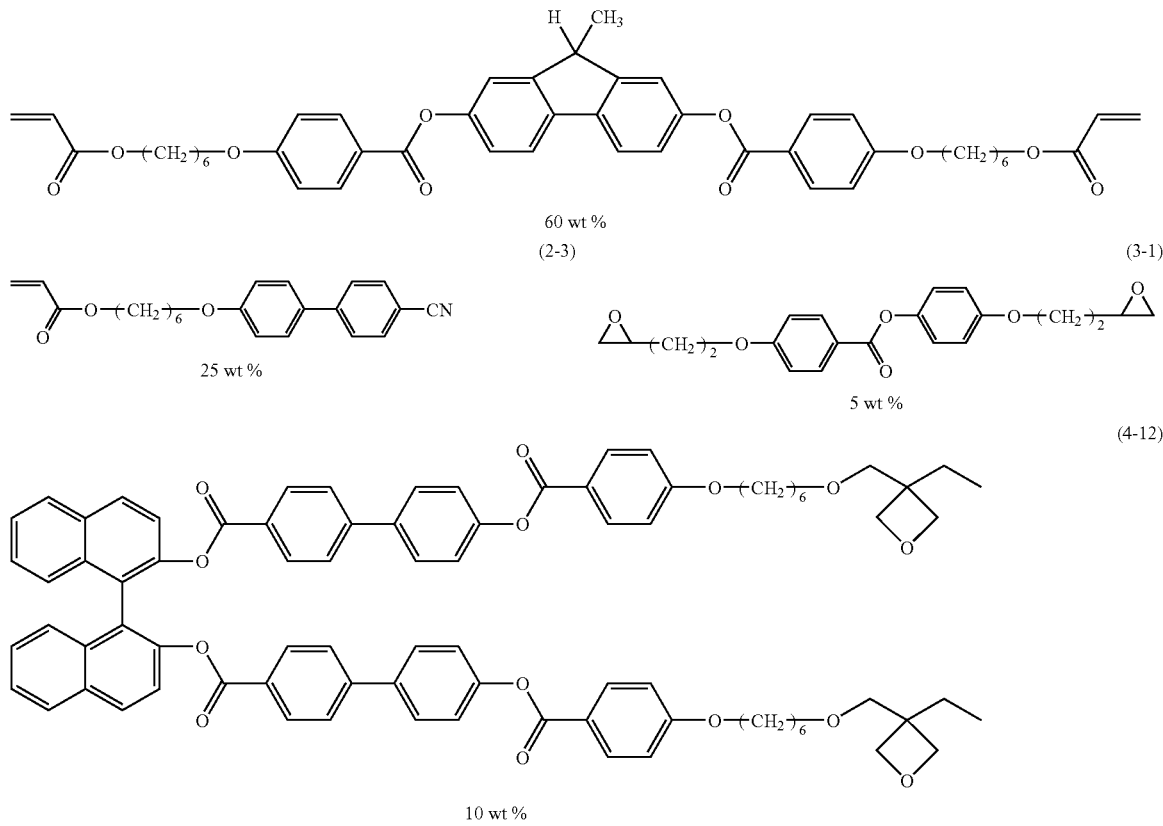

1 part by weight of the compound (6-1-1) and 1 part by weight of the compound (7-3-3) as a photopolymerization catalyst, and 0.5 part by weight of the compound (8-2-4) as a photosensitizer were added to 100 parts by weight of the polymerizable liquid crystal composition (MIX1), and the mixture was dissolved in toluene to prepare a solution having a content of (MIX1) of 30% by weight. The resulting solution was designated as a composition (PLC-1)

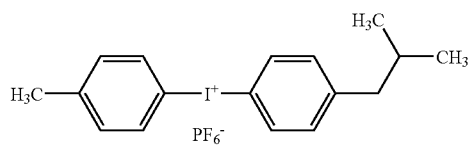
(6-1-1)

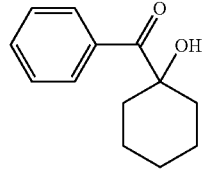
(7-3-3)

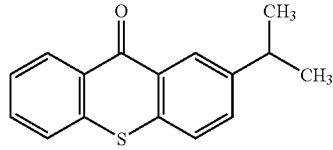
(8-2-4)

Example 2

<Production of Negative C-Plate (F1)>

A triacetyl cellulose film (TAC film) having been subjected to a saponification treatment was used as a supporting substrate. The measurement of a contact angle with water of the TAC film having been subjected to a saponification treatment revealed that the contact angle was 30°. The surface of the film was rubbed with a rayon cloth. The composition (PLC-1) described in Example 1 was coated on the TAC film by using a spin coater. After coating, the solvent was removed by treating the coated film in an oven set at 70° C. for 5 minutes to align the liquid crystal layer. The resulting coated film was irradiated with an ultraviolet ray (30 mW/cm², 365 nm) by using a super high pressure mercury lamp (250 W) at 25° C. for 30 seconds to obtain a tack-free polymer film (F1). The measurement results of the film (F1) with a polarization analyzer are shown in FIG. 1. It is understood from the measurement results that the film is a negative C-plate. The surface hardness of the film (F1) was HB in terms of pencil hardness. Completely no peeling was observed in the cellophane adhesive tape peeling test, and all the squares remained. No change in retardation was observed after the heat resistance test at 80° C. for 12 hours. Accordingly, the liquid crystal alignment film (F1) was hard to release from the supporting substrate and had optical anisotropy and sufficient hardness. The composition (PLC-1) did not suffer increase in viscosity in the accelerated test at 50° C.

Comparative Example 1

<Preparation of Composition (H-1)>

A cholesteric polymerizable liquid crystal composition containing the compound (1-1) (90% by weight) and the compound (4-12) (10% by weight) was prepared. The composition had a NI point of 40° C.

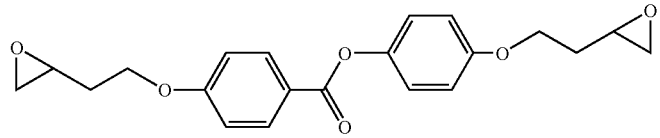
(1-1)

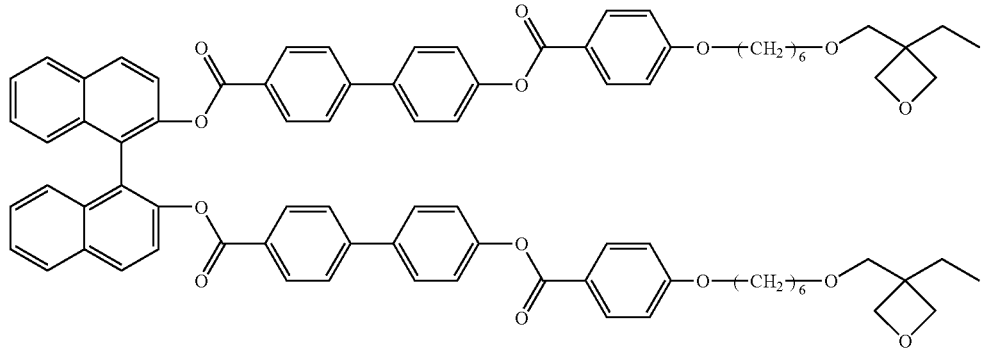
(4-12)

Example 3

<Preparation of Composition (PLC-2)>

A cholesteric polymerizable liquid crystal composition (MIX2) containing the compound (1-1-3) (70% by weight), the compound (2-3) (20% by weight) and the compound (4-12) (10% by weight) was prepared. The composition has a NI point of 127° C.

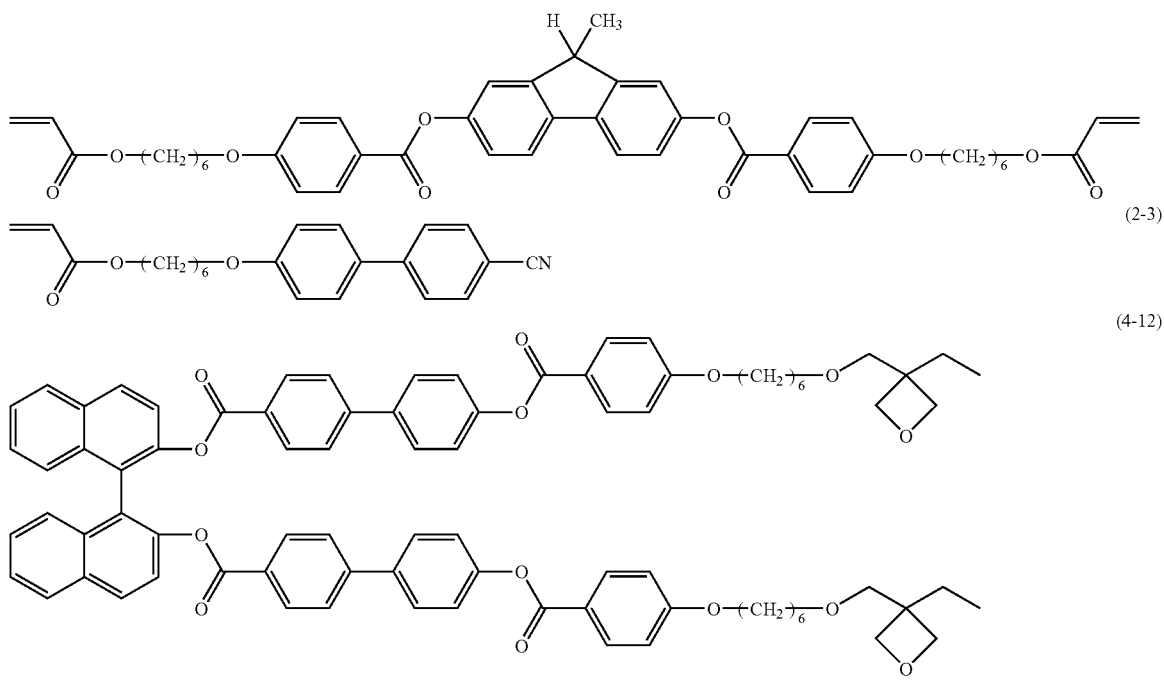

2 parts by weight of the compound (6-1-1) and 2 parts by weight of the compound (7-3-2) as a photopolymerization catalyst, and 1 part by weight of the compound (8-2-5) as a photosensitizer were added to 100 parts by weight of the polymerizable liquid crystal composition (MIX2), and the mixture was dissolved in toluene to prepare a solution having a content of (MIX2) of 30% by weight. The resulting solution was designated as a composition (PLC-2).

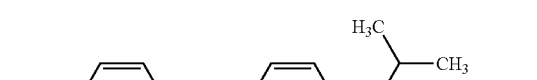

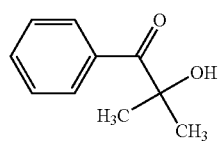

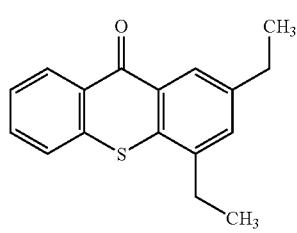

Example 4

<Production of Negative C-Plate (F2)>

Figure 2:
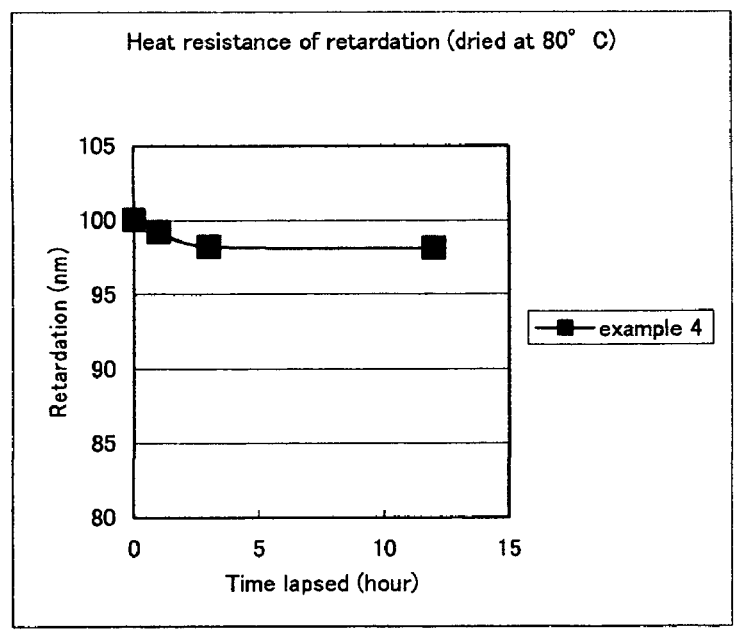
FIG. 2 is a graph showing results of a heat resistance test in retardation of a polymer film obtained in Example 4.

A TAC film having been subjected to a saponification treatment (contact angle with water: 30°) was used as a supporting substrate. The surface of the film was rubbed with a rayon cloth. The composition (PLC-2) described in Example 3 was coated on the TAC film by using a spin coater. After coating, the solvent was removed by treating the coated film in an oven set at 70° C. for 5 minutes to align the liquid crystal layer. The resulting coated film was irradiated with an ultraviolet ray (30 mW/cm$^2$, 365 nm) by using a super high pressure mercury lamp (250 W) at 25° C. for 60 seconds to obtain a tack-free polymer film (F2). The measurement results of the film (F2) with a polarization analyzer revealed that the film was a negative C-plate. The surface hardness of the film (F2) was HB in terms of pencil hardness. Completely no peeling was observed in the cellophane adhesive tape peeling test, and all the squares remained. No change in retardation was observed after the heat resistance test at 80° C. for 12 hours. Accordingly, a film having sufficient heat resistance can be obtained by increasing the amount of the photopolymerization catalyst and increasing the radiation amount of ultraviolet light even with composition no added with the compound (3)(see FIG. 2). Furthermore, the liquid crystal alignment film (F2) was hard to release from the supporting substrate and had optical anisotropy and sufficient hardness. The composition (PLC-2) did not suffer increase in viscosity in the accelerated test at 50° C.

Example 5

<Preparation of Composition (PLC-3)>

A cholesteric polymerizable liquid crystal composition (MIX3) containing the compound (1-2-9) (70% by weight), the compound (2-9) (20% by weight) and the compound (4-12) (10% by weight) was prepared.

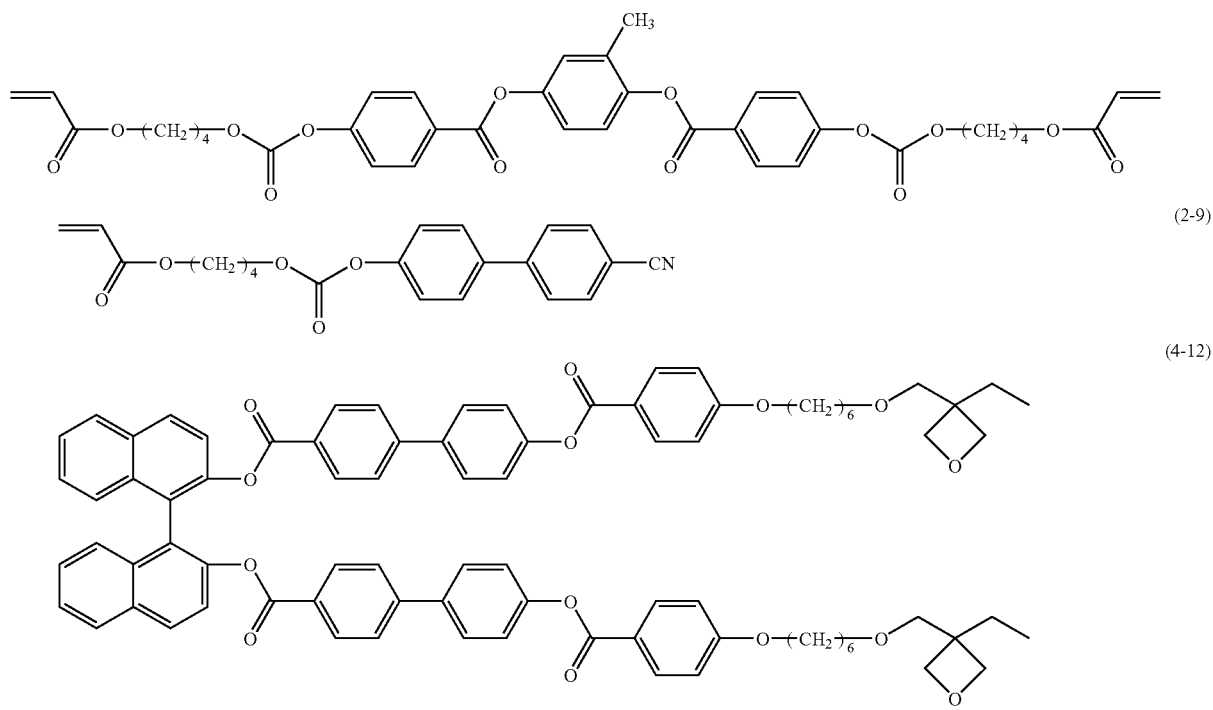

2 parts by weight of the compound (6-1-1) and 2 parts by weight of the compound (7-3-1) as a photopolymerization catalyst, and 1 part by weight of the compound (8-2-5) as a photosensitizer were added to 100 parts by weight of the polymerizable liquid crystal composition (MIX3), and the mixture was dissolved in toluene to prepare a solution having a content of (MIX3) of 30% by weight. The resulting solution was designated as a composition (PLC-3).

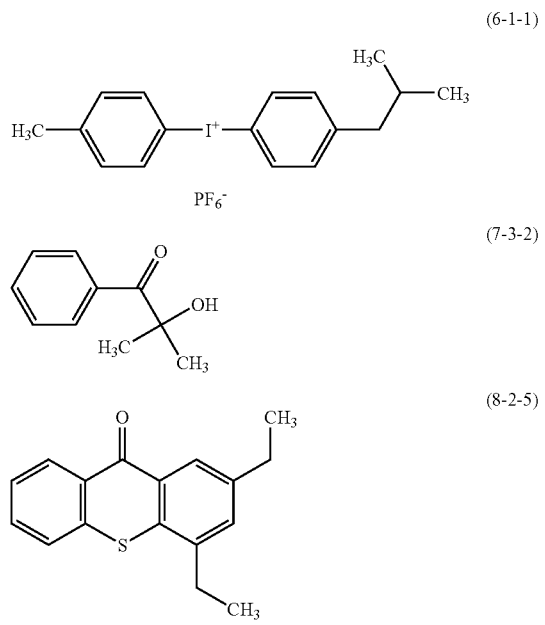

Example 6

<Production of Negative C-Plate (F3)>

A TAC film having been subjected to a saponification treatment (contact angle with water: 30°) was used as a supporting substrate. The surface of the film was rubbed with a rayon cloth. The composition (PLC-3) described in Example 5 was coated on the TAC film by using a spin coater. After coating, the solvent was removed by treating the coated film in an oven set at 70° C. for 5 minutes to align the liquid crystal layer. The resulting coated film was irradiated with an ultraviolet ray (30 mW/cm$^2$, 365 nm) by using a super high pressure mercury lamp (250 W) at 25° C. for 60 seconds to obtain a tack-free polymer film (F3). The measurement results of the film (F3) with a polarization analyzer revealed that the film was a negative C-plate. The surface hardness of the film (F3) was HB in terms of pencil hardness. Completely no peeling was observed in the cellophane adhesive tape peeling test, and all the squares remained. No change in retardation was observed after the heat resistance test at 80° C. for 12 hours. The liquid crystal alignment film (F3) was hard to release from the supporting substrate and had optical anisotropy and sufficient hardness. The composition (PLC-3) did not suffer increase in viscosity in the accelerated test at 50° C.

INDUSTRIAL APPLICABILITY

The polymerizable liquid crystal composition of the invention has, for example, the following advantages.

(1) The composition has a NI point (nematic-isotropic phase transition temperature) of 70° C. or more. Accordingly, the composition can maintain a liquid crystal state even in the case where the solvent drying step is carried out at a high temperature after coating the solution on a substrate. The composition can be aligned at a high temperature, whereby favorable alignment without alignment defects can be obtained.

(2) The composition has good adhesiveness to a substrate film (such as a saponified TAC film) to prevent peeling.

(3) The composition provides a film having sufficient heat resistance without tackiness with a small UV radiation amount.

(4) A film obtained by polymerizing the composition of the invention can be used as an optical compensation film, such as a negative C-plate.

The invention claimed is:

1. A polymerizable liquid crystal composition comprising at least one liquid crystal compound selected from compounds represented by Formula (1-1) and Formula (1-2) as a component (A), at least one liquid crystal compound selected from compounds represented by Formula (2) as a component (B), at least one liquid crystal compound selected from compounds represented by Formula (3) as a component (C), and at least one optically active compound selected from compounds represented by Formula (4) as a component (D), wherein a ratio of the component (A) is from 45 to 85% by weight, a ratio of the component (B) is from 10 to 30% by weight, a ratio of the component (C) is from 0 to 10% by weight, and a ratio of the component (D) is from 5 to 15% by weight, based on a total weight of the composition:

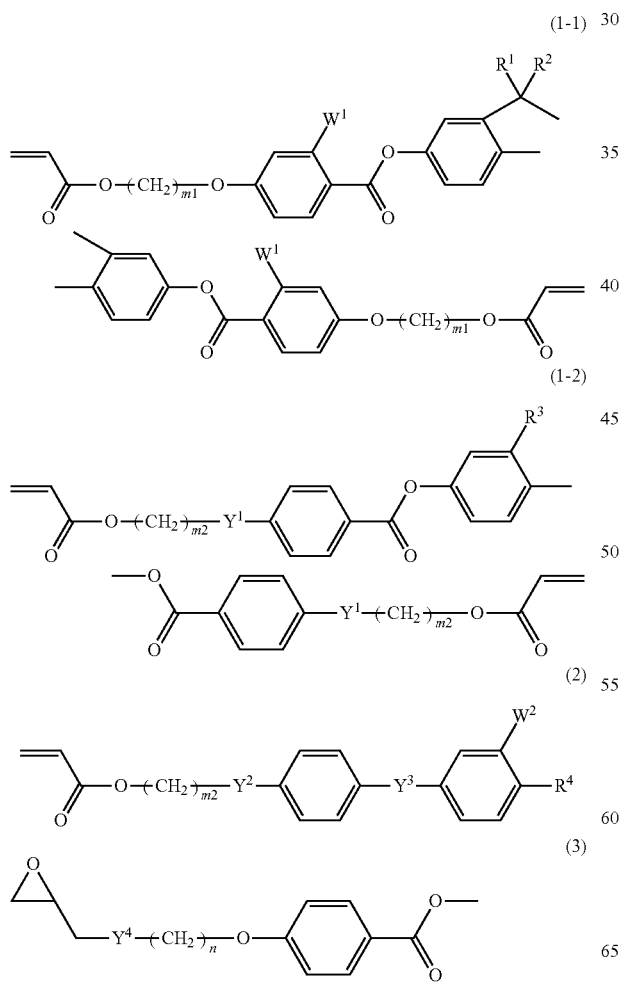

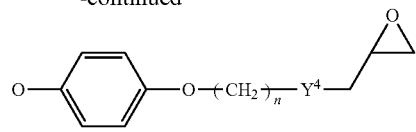

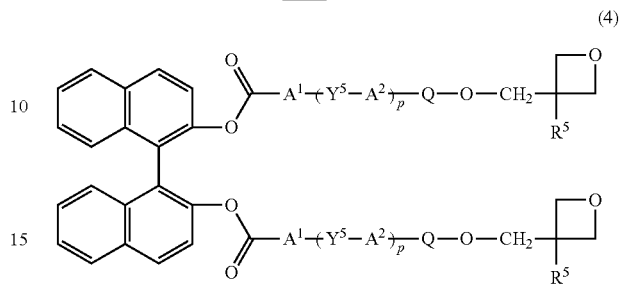

wherein
in Formula (1-1), $R^1$ and $R^2$ each independently represents hydrogen, methyl, ethyl, fluorine or chlorine; $W^1$ independently represents hydrogen or fluorine; and m1 independently represents an integer of from 1 to 10, in Formula (1-2), $R^3$ represents hydrogen, methyl, fluorine, chlorine, acetyl, acetoxy or methoxy; $Y^1$ independently represents —O— or a group represented by Formula (5); and m2 independently represents an integer of from 1 to 10:

in Formula (2), $R^4$ represents cyano, fluorine, chlorine, —OCF$_3$, alkyl having from 1 to 10 carbon atoms or alkoxy having from 1 to 10 carbon atoms; $Y^2$ represents a single bond, —O— or a group represented by Formula (5); $Y^3$ represents a single bond, —COO—, —OCO— or —C≡C—; $W^2$ represents hydrogen or fluorine; and m2 represents an integer of from 1 to 10, in Formula (3), $Y^4$ independently represents a single bond or —O—; and n independently represents an integer of from 0 to 10, and in Formula (4), $R^5$ independently represents methyl or ethyl; $A^1$ independently represents 1,4-phenylene or 4,4'-biphenylene; $A^2$ independently represents 1,4-phenylene or 4,4'-biphenylene; $Y^5$ independently represents —COO— or —OCO—; Q independently represents a single bond or oxyalkylene having from 1 to 10 carbon atoms; and p independently represents 0 or 1.

2. The polymerizable liquid crystal composition according to claim 1, wherein
the ratio of the component (A) is from 50 to 75% by weight, the ratio of the component (B) is from 15 to 30% by weight, the ratio of the component (C) is from 3 to 7% by weight, and the ratio of the component (D) is from 7 to 13% by weight,
in Formula (1-1), $R^1$ and $R^2$ each independently represents hydrogen or methyl; $W^1$ represents hydrogen or fluorine; and m1 represents an integer of from 2 to 8,
in Formula (1-2), $R^3$ represents hydrogen or methyl; $Y^1$ represents —O— or a group represented by Formula (5); and m2 represents an integer of from 2 to 8, in Formula (2), $R^4$ represents cyano, —$OCF_3$, alkyl having from 2 to 8 carbon atoms or alkoxy having from 2 to 8 carbon atoms; $Y^2$ represents —O— or a group represented by Formula (5); $Y^3$ represents a single bond or —COO—; $W^2$ represents hydrogen; and m2 represents an integer of from 2 to 8, in Formula (3), $Y^4$ independently represents a single bond or —O—; and n independently represents an integer of from 0 to 4, and in Formula (4), $R^5$ represents ethyl; $A^1$ represents 1,4-phenylene or 4,4'-biphenylene; $A^2$ represents 1,4-phenylene or 4,4'-biphenylene; $Y^5$ represents —OCO—; Q represents a single bond or oxyalkylene having from 2 to 8 carbon atoms; and p represents 0 or 1.

3. The polymerizable liquid crystal composition according to claim 1, wherein
the ratio of the component (A) is from 57 to 78% by weight, the ratio of the component (B) is from 15 to 30% by weight, the ratio of the component (C) is 0% by weight, and the ratio of the component (D) is from 7 to 13% by weight, in Formula (1-1), $R^1$ and $R^2$ each independently represents hydrogen or methyl; $W^1$ represents hydrogen or fluorine; and m1 represents an integer of from 2 to 8, in Formula (1-2), $R^3$ represents hydrogen or methyl; $Y^1$ represents —O— or a group represented by Formula (5); and m2 represents an integer of from 2 to 8, in Formula (2), $R^4$ represents cyano, —$OCF_3$, alkyl having from 2 to 8 carbon atoms or alkoxy having from 2 to 8 carbon atoms; $Y^2$ represents —O— or a group represented by Formula (5); $Y^3$ represents a single bond or —COO—; $W^2$ represents hydrogen; and m2 represents an integer of from 2 to 8, and in Formula (4), $R^5$ represents ethyl; $A^1$ represents 1,4-phenylene or 4,4'-biphenylene; $A^2$ represents 1,4-phenylene or 4,4'-biphenylene; $Y^5$ represents —OCO—; Q represents a single bond or oxyalkylene having from 2 to 8 carbon atoms; and p represents 0 or 1.

4. A polymer produced by polymerizing the polymerizable liquid crystal composition according to claim 1.

5. A polymer film having optical anisotropy produced by coating the polymerizable liquid crystal composition according to claim 1 on a transparent plastic substrate or a glass substrate, orienting the composition, and polymerizing the composition.

6. A negative C-plate comprising the polymer film having optical anisotropy according to claim 5.

7. A viewing angle compensation film comprising the negative C-plate according to claim 6, a positive A-plate and a polarizing plate laminated on each other.

* * * * *